(12) United States Patent
Nishiura et al.

(10) Patent No.: US 8,790,433 B2
(45) Date of Patent: Jul. 29, 2014

(54) MOISTURE SEPARATOR

(75) Inventors: Kensuke Nishiura, Tokyo (JP); Issaku Fujita, Tokyo (JP); Jiro Kasahara, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 232 days.

(21) Appl. No.: 13/297,874

(22) Filed: Nov. 16, 2011

(65) Prior Publication Data

US 2012/0131891 A1     May 31, 2012

(30) Foreign Application Priority Data

Nov. 26, 2010   (JP) ................................. 2010-263689
Jul. 27, 2011   (JP) ................................. 2011-164557

(51) Int. Cl.
| | |
|---|---|
| B01D 47/00 | (2006.01) |
| F22B 37/30 | (2006.01) |
| G21C 15/16 | (2006.01) |
| F22B 37/26 | (2006.01) |
| B01D 53/26 | (2006.01) |
| F22B 37/28 | (2006.01) |

(52) U.S. Cl.
CPC ................ *G21C 15/16* (2013.01); *F22B 37/30* (2013.01); *F22B 37/268* (2013.01); *B01D 53/265* (2013.01); *F22B 37/306* (2013.01); *Y02E 30/40* (2013.01); *F22B 37/286* (2013.01)
USPC ................... 55/423; 55/342; 55/343; 55/440; 55/441; 55/442; 55/443; 55/444; 55/445; 55/464; 55/465; 55/424; 55/425; 55/426; 96/356; 96/358

(58) Field of Classification Search
CPC .... B01D 45/08; A47L 9/1625; A47L 9/1641; A47L 9/1633; A47L 9/1683
USPC .......... 55/342–343, 440–445, 464–465, 434, 55/423, 424–426; 96/356, 358
See application file for complete search history.

(56) References Cited

U.S. PATENT DOCUMENTS

| | | | |
|---|---|---|---|
| 4,175,938 A | 11/1979 | Regehr et al. | |
| 4,581,051 A | 4/1986 | Regehr et al. | |

(Continued)

FOREIGN PATENT DOCUMENTS

| | | | |
|---|---|---|---|
| JP | 50-128873 A | 10/1975 | |
| JP | 51-045376 A | 4/1976 | |

(Continued)

OTHER PUBLICATIONS

International Search Report of PCT/JP20111076069, mailing date Feb. 14, 2012.

(Continued)

*Primary Examiner* — Dung H Bui
(74) *Attorney, Agent, or Firm* — Westerman, Hattori, Daniels & Adrian, LLP

(57) ABSTRACT

A moisture separator where a corrugated plate 43 is provided with a collecting plate 49 formed to cover a flat portion 74 and an upstream end of a slope portion disposed on a downstream side of the flat portion 74. The collecting plate 74 has an opening which opens to an upstream side in the direction of the wet steam flow S1. The collecting plate 49 is fixed to the slope portion at a base end. Between the collecting plate 49 and a body portion of the corrugated plate, a pocket section 47 and a drain duct section 48 are formed. The moisture contained in the wet steam S1 turns into droplets and enters the pocket section 47 and the drain duct section 48 from the opening of the collecting plate 49 and falls down the pocket section 47 and the drain duct section 48 respectively by gravity.

11 Claims, 19 Drawing Sheets

(56) References Cited

U.S. PATENT DOCUMENTS

| | | |
|---|---|---|
| 4,738,698 A | 4/1988 | Holcblat |
| 2004/0069243 A1 | 4/2004 | Ishiguro et al. |
| 2010/0065253 A1 | 3/2010 | Fujita et al. |

FOREIGN PATENT DOCUMENTS

| | | |
|---|---|---|
| JP | 54-039271 A | 3/1979 |
| JP | 56-53716 A | 5/1981 |
| JP | 59-130514 A | 7/1984 |
| JP | 60-190214 A | 9/1985 |
| JP | 61-265489 A | 11/1986 |
| JP | 62-185306 U | 11/1987 |
| JP | 62-279818 A | 12/1987 |
| JP | 6-222190 A | 8/1994 |
| JP | 8-332331 A | 12/1996 |
| JP | 2002-126429 A | 5/2002 |
| JP | 2002-311180 A | 10/2002 |
| JP | 2008-194633 A | 8/2008 |
| JP | 2010-071485 A | 4/2010 |

OTHER PUBLICATIONS

Translation of the International Preliminary Report on Patentability (PCT/IB/326) (1 page), (PCT/IB/373) (1 page) of International Application No. PCT/JP2011/076069 mailed Jun. 6, 2013 (Form PCT/ISA1237) (6 pages).

Translation of the International Preliminary Report on Patentability (PCT/IB/338) (1 page), (PCT/Ib/373) (1 page) of International Application No. PCT/JP2011/076069 mailed Jun. 20, 2013 (Form PCT/ISA/237) (8 pages).

Extended European Search Report dated May 30, 2014, issued in corresponding European Patent Application No. 11842598.2 (6 pages).

FRAGMENTARY VIEW ALONG LINE B - B

FRAGMENTARY VIEW ALONG LINE C - C

MOISTURE SEPARATOR

TECHNICAL FIELD

The present invention relates to a moisture separator which eliminates moisture from steam, which is applicable to, for example, a power generation plant such as a nuclear power plant and a blast-furnace gas (BFG) fired gas turbine combined-cycle (GTCC) system.

BACKGROUND ART

A moisture separator is normally used in a power generation plant such as a nuclear power plant to eliminate moisture from steam generated in a steam generator or to eliminate moisture from moist steam discharged from a high pressure turbine so as to supply dry steam toward a low pressure turbine. This suppresses erosion of the turbine blades and also improves plant efficiency.

A chevron-vane type moisture separator is a known moisture separator such a one disclosed in Patent Literature 1.

FIG. 23 is a perspective view of a conventional moisture separator of chevron-vane type.

FIG. 23 shows the moisture separator 60 where a plurality of corrugated plates 63 are laid between an upper frame 61 and a lower frame 62. Each corrugated plate 63 has a zigzag cross-sectional shape with projections, depressions and flat parts that are arranged alternately. Each of the flat parts has a pocket part. Moist steam S1 enters the moist separator 60 in a direction of an arrow and mist contained in the moist steam S1 adheres on a surface of the corrugated plate 63. Then the moisture streaming in a direction of the moist steam S1 along the surface of the corrugated plate 63 is captured at the pocket part and retained in the pocket part.

The retained moisture falls down along the surface of the corrugated plate 63 into a groove 64 provided at the bottom. Moisture flying along the stream of the moist steam S1 collides against the corrugated plate 63 and is captured by the pocket part in the same manner as above to be removed from the moist steam S1.

The moist air S1, from which the moisture is removed by the moisture separator 60, becomes dry steam S2 and is heated by a heating device (not shown) such as a group of heating tubes provided separately.

CITATION LIST

Patent Literature

PTL 1
JP2002-311180A

SUMMARY OF INVENTION

Technical Problem

Recently, it is desired to increase a size of a nuclear power plant in which a moisture separator is used. With such increase in the size of the nuclear power plant, an amount of steam introduced to moisture separator increases, the flow rate of the steam streaming through the moisture separator becomes higher and thus, it becomes difficult to separate the moisture sufficiently by the moisture separator.

Therefore, it is necessary in response to the increasing size of the nuclear power plant, to make a larger moisture separator so as to avoid the gain in the flow rate of the steam streaming through the moisture separator in comparison to the conventional case. Specifically, it is necessary to make the corrugated plate 63 of FIG. 23 taller.

However, making the corrugated plate 63 taller may cause, in comparison to the conventional case, higher load of collecting the moisture per each corrugated plate, a thicker liquid film formed by the moisture falling down along the pocket section 76 and a higher likelihood of re-entrainment of the moisture. This results in decrease in performance of moisture separation.

FIG. 24 is a graph showing a relationship between a flow rate of steam entering the moisture separator of the related art and a moisture percentage at an outlet of the moisture separator of the related art. In the graph of FIG. 24, the horizontal axis represents the flow rate of the steam entering the moisture separator and the vertical axis represents the moisture percentage at the outlet of the moisture separator. In FIG. 24, a shorter vane shown by a solid line indicates a moisture separator in a height of the conventional corrugated plated used prior to upsizing of the moisture separator, whereas a long vane shown by a dotted line indicates a moisture separator in a height of the corrugated plate in the case of upsizing the moisture separator.

As shown in FIG. 24, once the flow rate of the steam introduced to the moisture separator reaches limits (s1 and s2 respectively) in both cases of the short vane and the long vane, the moisture percentage at the outlet of the moisture separator rapidly increases and in another word, the performance of the moisture separator drops. The limits (s1 and s2) indicate performance limits of moisture separation by the corrugated plate.

At a flow rate lower than the limits (s1, s2), there is a slow increase in the moisture percentage at the outlet of the moisture separator. This is due to performance decline of the moisture separator due to the re-entrainment of the moisture having once collected in the pocket. This is more evident in the case of the long vane.

In view of the issues of the related art, an object of the present invention is to provide a moisture separator that is capable of suppressing the performance drop of the moisture separator by suppressing increasing in thickness of the liquid film formed by the moisture collected by a corrugated plate and by suppressing the re-entrainment of the moisture collected by the corrugated plate.

Solution to Problem

To solve the above issues, the present invention provides a moisture separator which separates moisture from moist steam and which may include, but is not limited to:

a plurality of corrugated plates each having a zigzag cross-sectional shape with a projection and a depression that are arranged alternately, said plurality of corrugated plates being arranged at an interval to form a steam passage for the moist steam; and a plurality of collecting plates which are fixed to the corrugated plates, each of said collecting plates extending upstream in a direction of a steam flow within the steam passage so as to cover each of the projection and depression.

Between the collecting plate and each of the corrugated plates, a pocket section is formed with an opening which opens to an upstream side in the direction of the steam flow. A drain duct section is provided on a downstream side of the pocket section in the direction of the steam flow and is in communication with the pocket section, said drain duct extending vertically.

The projection which covered by the collecting plate herein refers to a part which projects with respect to the steam passage. For instance, from a viewpoint of a first steam passage formed on one side of the corrugated plate, the projection is a part projecting towards the first steam passage is the projection. On the other, from a view point of a second steam passage formed on other side of the same corrugated plate, the projection is a part projecting toward the second passage. In the specification, when simply expressed as a "projection" of the corrugated plate, the projection of the corrugated plate refers to the part projecting toward an intended steam passage.

By this, the moisture collected in the pocket section streams into the drain duct section by the steam flow and falls down the drain duct section. Thus, by reducing the amount of the moisture falling down the pocket section and suppressing increasing in the thickness of the liquid film, it is possible to suppress the re-entrainment of the moisture collected in the pocket section. By providing the drain duct section on the downstream side of the pocket section in the direction of the steam flow, the moisture falling down the drain duct is unlikely to flow back into the steam passage by the steam flow. Thus, it is possible to suppress the re-entrainment of the moisture from the drain duct section. As a result, with an increased height of the corrugated plate, the decrease in performance of moisture separation caused by the re-entrainment of the moisture can be suppressed.

The collecting plate may be fixed to the corrugated plate on a downstream side of the depression in the direction of the steam flow and between the collecting plate and the corrugated plate, a space having an upstream portion and a downstream portion arranged in the direction of the steam flow may be formed. The upstream and downstream portions respectively function as the pocket section and the drain duct section.

In this manner, by fixing the collecting plate to the corrugated plate on the downstream side of the depression in the direction of the steam flow, the drain duct section is formed between an end part of the collecting plate and the corrugated plate. The drain duct section is arranged behind the projection and thus, the moisture falling down the drain duct section is unlikely to flow back to the steam passage. Therefore, it is possible to effectively suppress the re-entrainment of the moisture collected in the drain duct section.

Further, the corrugated plate may be arranged to satisfy a relationship of $0 \leq D/L \leq 0.5$ where D is a distance between the projection and a position to which the collecting plate is fixed and L is a distance between the projection and the depression of the corrugated plate.

When the distance between the projection and the position to which the collecting plate is fixed is long, a large amount of the steam streams into the drain duct section. This may causes the collecting plate to separate from the corrugated plate. However, in the present invention, the collecting plate is fixed to the corrugated plate to satisfy the relationship of $0 \leq D/L \leq 0.5$ where D is the distance between the projection and the position to which the collecting plate is fixed and L is the distance between the projection and the depression of the corrugated plate so as to control the steam flow entering the drain duct section. By this, it is possible to prevent the collecting plate from coming off from the corrugated plate.

The above moisture separator may further include a drain plate which is provided between the collecting plate and the corrugated plate to direct the moisture entrained in the pocket section to the drain duct section. The drain plate may be arranged horizontally or downwardly-inclined toward a downstream side in the direction of the steam flow.

By providing the drain plate in the pocket section, the moisture collected in the pocket section above the drain plate falls down the pocket section and moves over the drain plate to enter the drain duct section. Therefore, the moisture collected in the pocket section above the drain plate does not fall down the pocket section past the drain plate and thus, it is possible to suppress increasing in thickness of the liquid film by reducing the amount of moisture falling down the pocket section.

By arranging the drain plate horizontally or inclining the drain plate downwardly toward the downstream side, it is possible to prevent the moisture over the drain plate from flowing back to the steam passage from the pocket section.

Alternatively, a plurality of the drain plates may be provided in a height direction of the pocket section.

By providing a plurality of the drain plates in the pocket section, even with an increased height of the corrugated plate, it is possible to suppress increasing in thickness of the liquid film formed in the pocket section, thereby preventing the re-entrainment of the moisture.

The above moisture separator may further include a duct plate which is provided on an outer surface of the collecting plate and extends vertically. The pocket section may be formed between the collecting plate and the corrugated plate and the drain duct section may be formed between the duct plate and the collecting plate. The drain duct section may be in communication with the pocket section through a drain through-hole which is formed in the collecting plate.

By arranging the collecting plate with the drain through-hole between the pocket section and the drain duct section, the moisture collected in the pocket section above the drain plate falls down the pocket section and moves over the drain plate into the drain duct section through the drain through-hole. The moisture collected in the pocket section above the drain plate does not falls down the pocket section past the drain plate and thus, it is possible to suppress increasing in thickness of the liquid film by reducing the amount of the moisture falling down the pocket section.

By providing the collecting plate, there is not re-entrainment of the moisture collected in the drain duct section and thus, the performance of moisture separation can be improved.

The above moisture separator according to claim 6 may also include a drain plate which is provided between the collecting plate and the corrugated plate to direct the moisture entrained in the pocket section to the drain duct section via the drain through-hole. The drain plate may be arranged horizontally or be downwardly-inclined toward a downstream side in the direction of the steam flow.

By arranging the drain plate in the pocket section, the moisture collected in the pocket section above the drain plate falls down the pocket section and moves over the drain plate into the drain duct section. The moisture collected in the pocket section above the drain plate does not falls down the pocket section past the drain plate and thus, it is possible to suppress increasing in thickness of the liquid film by reducing the amount of the moisture falling down the pocket section.

By arranging the drain plate horizontally or inclining the drain plate downwardly toward the downstream side, it is possible to prevent the moisture over the drain plate from flowing back to the steam passage from the pocket section.

Alternatively, a plurality of the drain plates may be provided in a height direction of the pocket section, and a plurality of the drain through-holes may be respectively provided for drain plates so that a top surface of each of the drain plates is in communication with the drain duct section.

By providing a plurality of the drain plates in the pocket section, even with an increased height of the corrugated plate, it is possible to suppress increasing in thickness of the liquid film formed in the pocket section, thereby preventing the re-entrainment of the moisture.

The above drain plates may be arranged so as to equally divide the pocket section in the height direction.

By providing the drain plates to equally divide the pocket section in the height direction, an amount of the moisture collected between each adjacent pair of the drain plates is almost the same and thus, it is possible to prevent uneven performance of moisture separation depending on a position in the height direction.

The above moisture separator may also include a backflow preventing member which is provided in the pocket section and prevents the moisture entrained in the pocket section from flowing back to the steam passage.

By providing the backflow preventing member in the pocket section, it is possible to prevent the moisture collected in the pocket section and the drain duct section from flowing back to the steam passage.

Advantageous Effects of Invention

According to the present invention, it is possible to provide the moisture separator that is capable of suppressing the performance drop of the moisture separator by suppressing increasing in thickness of the liquid film formed by the moisture collected by the corrugated plate and by suppressing the re-entrainment of the moisture collected by the corrugated plate.

DESCRIPTION OF EMBODIMENTS

A preferred embodiment of the present invention will now be described in detail with reference to the accompanying drawings. It is intended, however, that unless particularly specified, dimensions, materials, shape, its relative positions and the like shall be interpreted as illustrative only and not limitative of the scope of the present invention.

Figure 1:
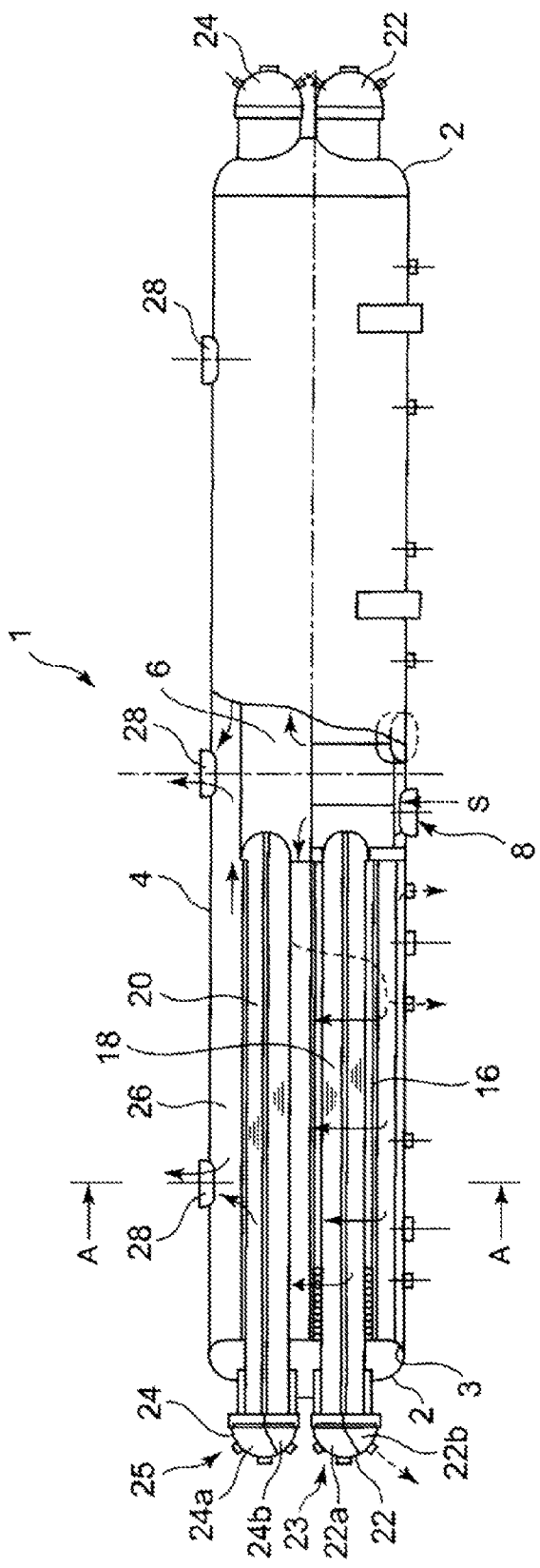
FIG. 1 is a side view of a moisture separator/heater of a preferred embodiment, which is partially shown in section.
Figure 2:
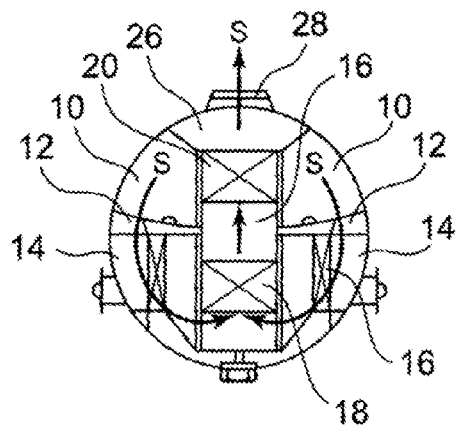
FIG. 2 is a fragmentary view taken along a line A-A of FIG. 1.

A moisture separator/heater to which a moisture separator of each preferred embodiment is applied is explained in reference to FIG. 1 and FIG. 2. FIG. 1 is a side view of the moisture separator/heater of a preferred embodiment, which is partially shown in section. FIG. 2 is a fragmentary view taken along a line A-A of FIG. 1.

As shown in FIG. 1 and FIG. 2, a moisture separator/heater 1 essentially consists of end plates 2 and a shell plate 4. Between the shell plate and the end plates 2, a divider wall 3 is provided.

As shown in FIG. 1, in a central part of the shell plate 4 in the axial direction except for a top part, a steam receiving chamber 6 is formed with a steam inlet port 8.

As shown in FIG. 2, a manifold chamber 10 is formed within the shell plate 4 nearer to each end in the axial direction, on an outer side in the radial direction and on an upper side except for the top part. Underneath the manifold chamber 10, a distributor plate 12 is arranged. Below the manifold chamber 10, a moisture separator chamber 14 is formed. In the moisture separator chamber 14, a chevron-vane type moisture separator 16 in relation to the present invention is provided.

As shown in FIG. 1, a heating chamber 36 is formed nearer to each end in the axial direction, i.e. in a region surrounded by the manifold chamber 10 and the moisture separator chamber 14. The heating chamber 36 is in communication with the moisture separator chamber 14. On a lower side in the heating chamber 36, a first-stage tube bundle 18 is arranged such as to direct tube ends toward the ends of the shell plate 4 in the axial direction. Above the first-stage tube bundle 18 in the heating chamber 36, a second-stage tube bundle 20 is arranged such as to direct the tube ends toward the ends of the shell plate 4 in the axial direction.

On both ends of the shell plate 4 in the axial direction and in a lower part of an inner side in the radial direction, a first-stage steam room 22 is provided. The first-stage steam room 22 is partitioned into a distributing part 22a and a recovery part 22b inside. On both ends of the shell plate 4 in the axial direction and in an upper part of an inner side in the radial direction, a second-stage steam room 24 is provided.

The second-stage steam room 24 is partitioned into a distributing part 24a and a recovery part 24b inside.

The distributing part 22a, 24a of each of the steam rooms 22, 24 is supplied with steam 23, 25 for heating. To the recovery part 22b, 24b of each of the steam rooms 23, the steam 23, 25 is discharged as condensate.

To the distributing part 22a, tube ends of one side of the first-stage tube bundle 18 are connected. To the recovery part 22b, tube ends of other side of the first-stage tube bundle 18 are connected. In the same manner, to the distributing part 24a, tube ends of one side of the second-stage tube bundle 20 are connected. To the recovery part 24b, tube ends of other side of the second-stage tube bundle 24 are connected.

As shown in FIG. 1 and FIG. 2, in the top part within the shell plate 4, a recovery manifold chamber 26 is formed in a continuous manner in the axial direction of the shell plate 4. The recovery manifold chamber 26 is in communication with the heating chamber 36. In the top part within the shell plate 4, a plurality of steam delivery ports 28 are provided in communication with the recovery manifold chamber 26 to feed the steam out to a low-pressure steam turbine (not shown).

An operation of the moisture separator/heater 1 according to the preferred embodiment is explained now.

The steam S exhausted from devices located upstream such as a high-pressure steam turbine, is supplied into the steam receiving chamber within the shell plate 4. Then, the steam S enters the manifold chamber 10.

Next, the steam S streams through the moisture separator 16 within the moisture separator chamber 14 via the distributor plate 12, resulting in removing moisture from the steam. Finally, the steam having the moisture removed streams into the heating chamber 36.

After entering the heating chamber 36, the steam S comes in contact with the first-stage tube bundle 18 and is heated by heating steam 23 streaming in the first-stage tube bundle 18. The steam 5, then comes in contact with the second-stage tube bundle 20 and is heated by the heating steam 25 streaming in the second-stage tube bundle 20. Finally, the steam S enters the recovery manifold chamber 26.

After entering the recovery manifold chamber 26, the steam S streams in the recovery manifold chamber 26 and is delivered through the steam delivery port 28 to be supplied to the devices located downstream such as the low-pressure steam turbine.

The chevron-vane type moisture separator 16 according to the present invention is used in the moisture separator/heater 1 having the above structure and operation and is now explained.

Figure 3:
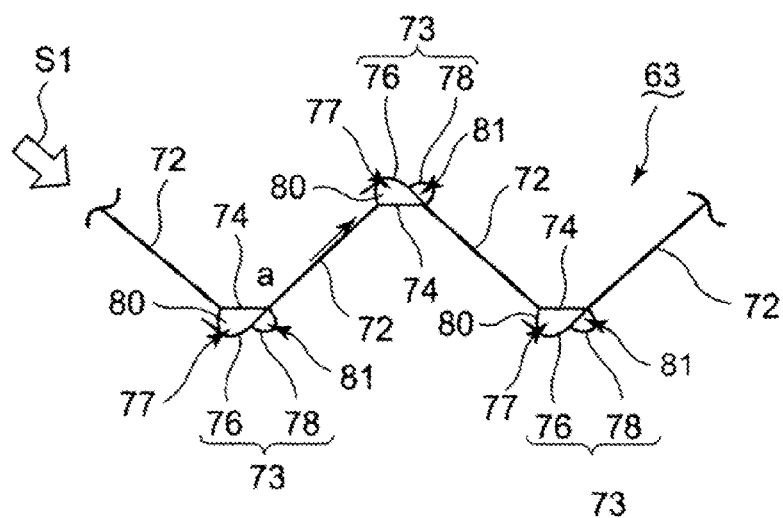
FIG. 3 is a top view of a part of a corrugated plate in relation to a first preferred embodiment of the present invention.
Figure 4:
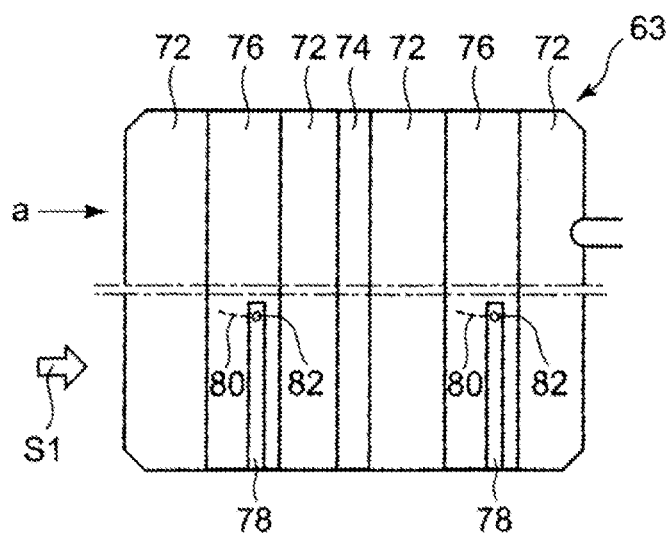
FIG. 4 is a side view of a part of the corrugated plate in relation to the first preferred embodiment of the present invention.
Figure 5:
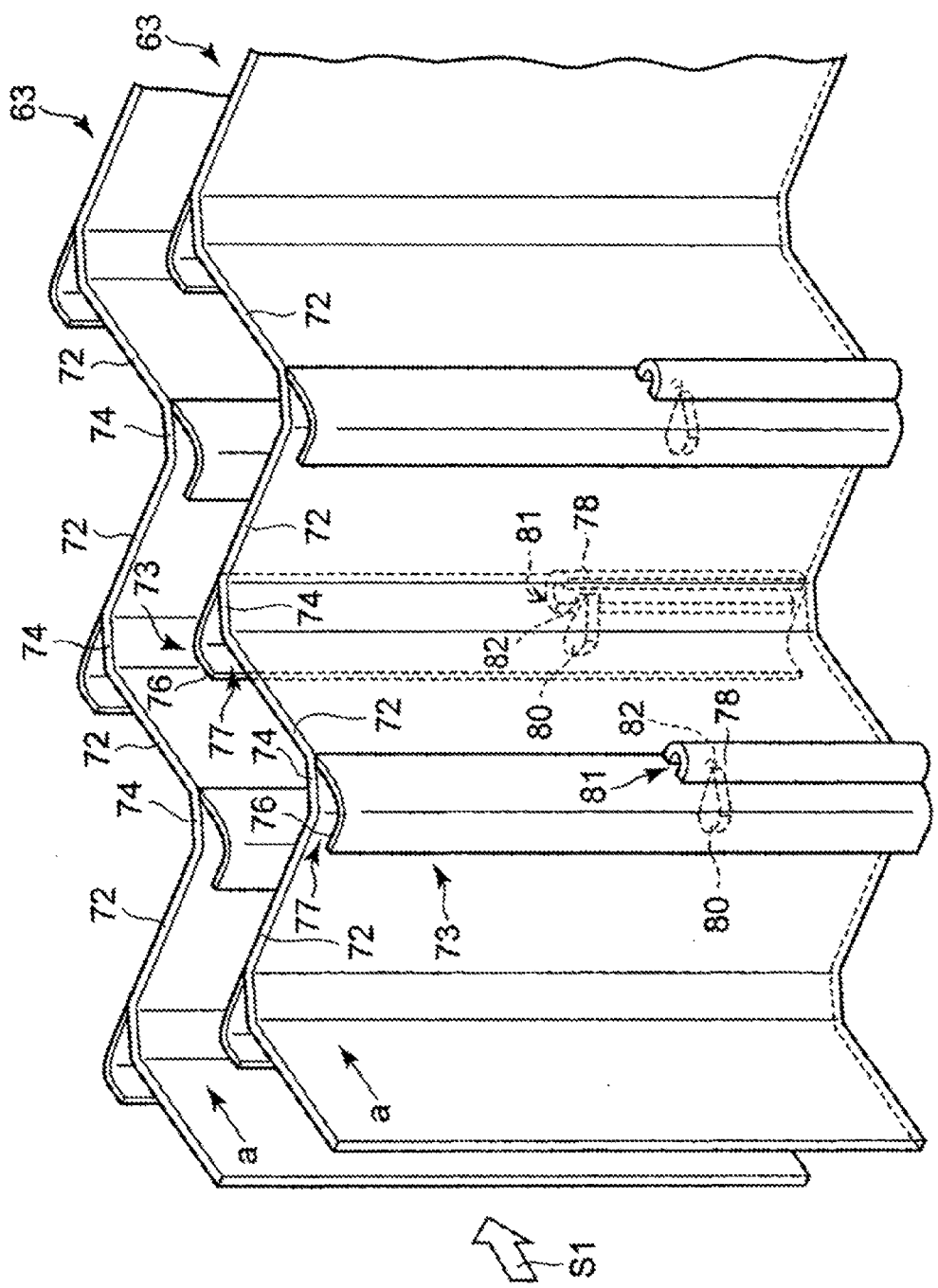
FIG. 5 is a perspective view of a corrugated plate in relation to a preferred embodiment.

FIG. 3 and FIG. 4 respectively show a top view and a side view of a part of a corrugated plate in relation to a first preferred embodiment of the present invention. FIG. 5 is a perspective view of the corrugated plate in relation to the preferred embodiment.

As shown in FIG. 3 through FIG. 5, the corrugated plate 63 of the preferred embodiment has a slope portion 72 (a portion between a projection which projects toward the steam passage and a depression which is depressed with respect to the steam passage) and a flat portion 74. The corrugated plate 63 for collecting steam is also provided with a protruding member 73 which is formed to cover the flat portion 74 and which has an opening that opens to a steam flow S1.

The protruding member 73 includes a collecting plate 76 which extends upstream in the direction of the steam flow from the slope portion 72 disposed on a downstream side of the flat portion such as to cover the flat portion (projection) 74. The collecting plate 76 is fixed to the slope portion 72 at a base end thereof by welding or the like. The collecting plate 76 curves from the base end toward a tip end thereof. Between the collecting plate 76 and the flat portion 74, a pocket section 77 is formed. The pocket section 77 is formed such that a depth and a width thereof are greater than a width of the opening of the collecting plate 76 opening to the steam flow. The wet steam S1 streams along the surface of the corrugated plate 63 and enters the pocket section 77.

The protruding member 73 is arranged in contact with an outer surface of the collecting plate 76 at a downstream part thereof which is on a downstream side in the direction of the wet steam flow S1. The protruding member 73 includes a duct plate extending in a height direction. The duct plate 78 has an arc-shaped cross-section with each end fixed to the collecting plate 76. A drain duct section 81 is formed between the collecting plate 76 and the duct plate 78. Herein, the drain duct section is portioned from the pocket section 77 by the collecting plate 76.

In the pocket section 77 of the protruding member 73, drain plates 80 are provided to partition the pocket section 77 in the height direction. The drain plates 80 are downwardly-inclined toward a downstream side in the direction of the steam flow.

In the collecting plate 76, a drain through-hole 82 is formed above the drain plate 80 near a connection point of the drain plate 80 with the collecting plate 76 such that a top surface of the drain plates 80 are in communication with the drain duct section 81.

In the corrugated plate 63 configured as described above, in the case where the wet steam S1 streams through the steam passage between the corrugated plates 63 in the direction of the arrow A as shown in FIG. 3 through FIG. 5, the moisture contained in the wet steam S1 hits a surface of the slope portion 72 of the corrugated plate, the moisture turns into droplets on the surface of the slope portion 72 and the droplets adhere thereto. The droplets are pushed by the flow of the wet steam S1 along the surface of the slope portion 72 in the direction of the arrow a and reach the flat portion 74. At the flat portion 74, the droplets are pushed by the wet steam S1 and enter the pocket section 77 from the opening of the collecting plate 76. In the pocket section 77, the droplets form a liquid film. Meanwhile, the wet steam S1 flows outside the collecting plate 76 toward the downstream side. Thus, it is possible to collect only the moisture in the collecting plate 76 smoothly.

Figure 23:
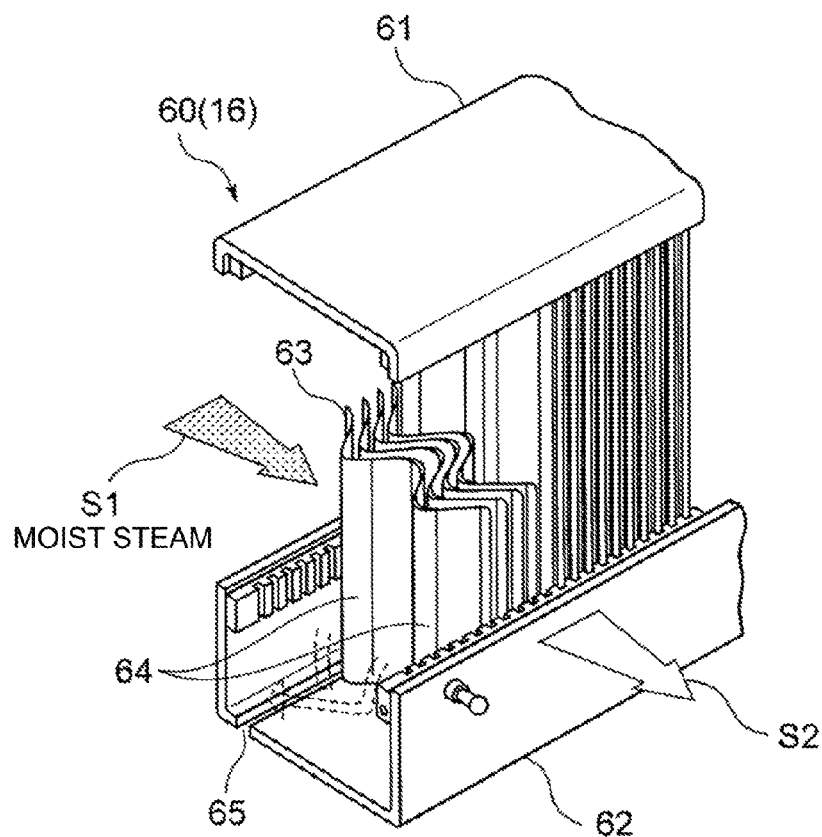
FIG. 23 is a perspective view of a chevron-vane type moisture separator of related art.
Figure 24:
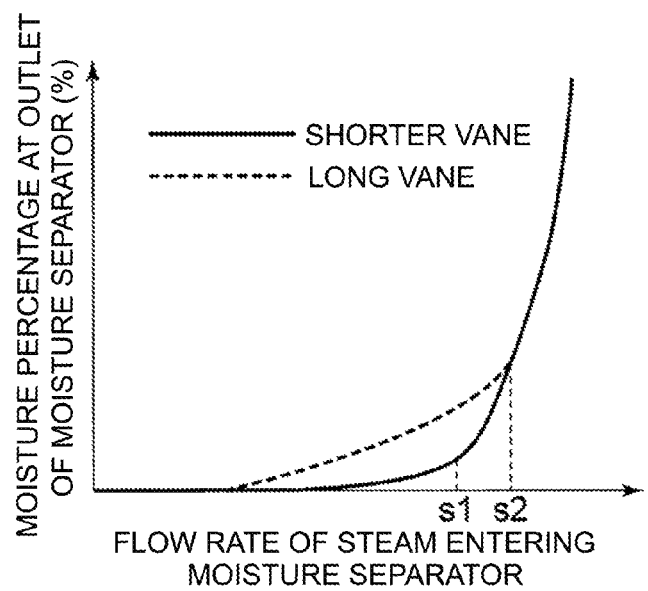
FIG. 24 is a graph showing a relationship between a flow rate of steam entering the moisture separator of the related art and a moisture percentage at an outlet of the moisture separator of the related art.

The moisture collected in the pocket section 77 as the liquid film, falls down the pocket section 77 by gravity. The moisture collected below the drain plate 80 in the pocket section 77 falls to a bottom in the pocket section 77 and then flows down to a drain 65 (see FIG. 23) arranged under the pocket section 77 to be collected.

The moisture collected above the drain plate 80 in the pocket section 77 falls down the pocket section 77 and reaches the top surface of the drain plate 80. Then, the moisture is changed its direction by the drain plate 80 and is pushed by a tilt of the drain plate 80 and the wet steam S1 to flow downward on the drain plate 80 in the direction of the tilt. Once the moisture reaches the drain through-hole 82, the moisture enters the drain duct section 81 inside the duct plate 78 via the drain through-hole 82 and falls down the drain duct section 81 to the bottom and then flows down to the drain 65 to be collected.

As described above, according to the first preferred embodiment, the moisture collected in the pocket section 77 above the drain plate 80, moves over the drain plate 80 and enters the drain duct section 81. Then, the moisture falls down the drain duct section 81 and thus, such moisture does not fall down the pocket section 77 past the drain plate 80. This suppresses an amount of the moisture falling down the pocket section 77, thereby reducing a thickness of the liquid film. As a result, it is possible to prevent re-entrainment of the moisture collected by the corrugated plate 63. The pocket section 77 and the drain duct section 81 are partitioned by the collecting plate 76 so as to prevent re-entrainment of the moisture having entered the drain duct section 81. Therefore, even with an increased height of the corrugated plate 63, it is possible to suppress a decrease in performance of moisture separation caused by the re-entrainment of the moisture.

Figure 6:
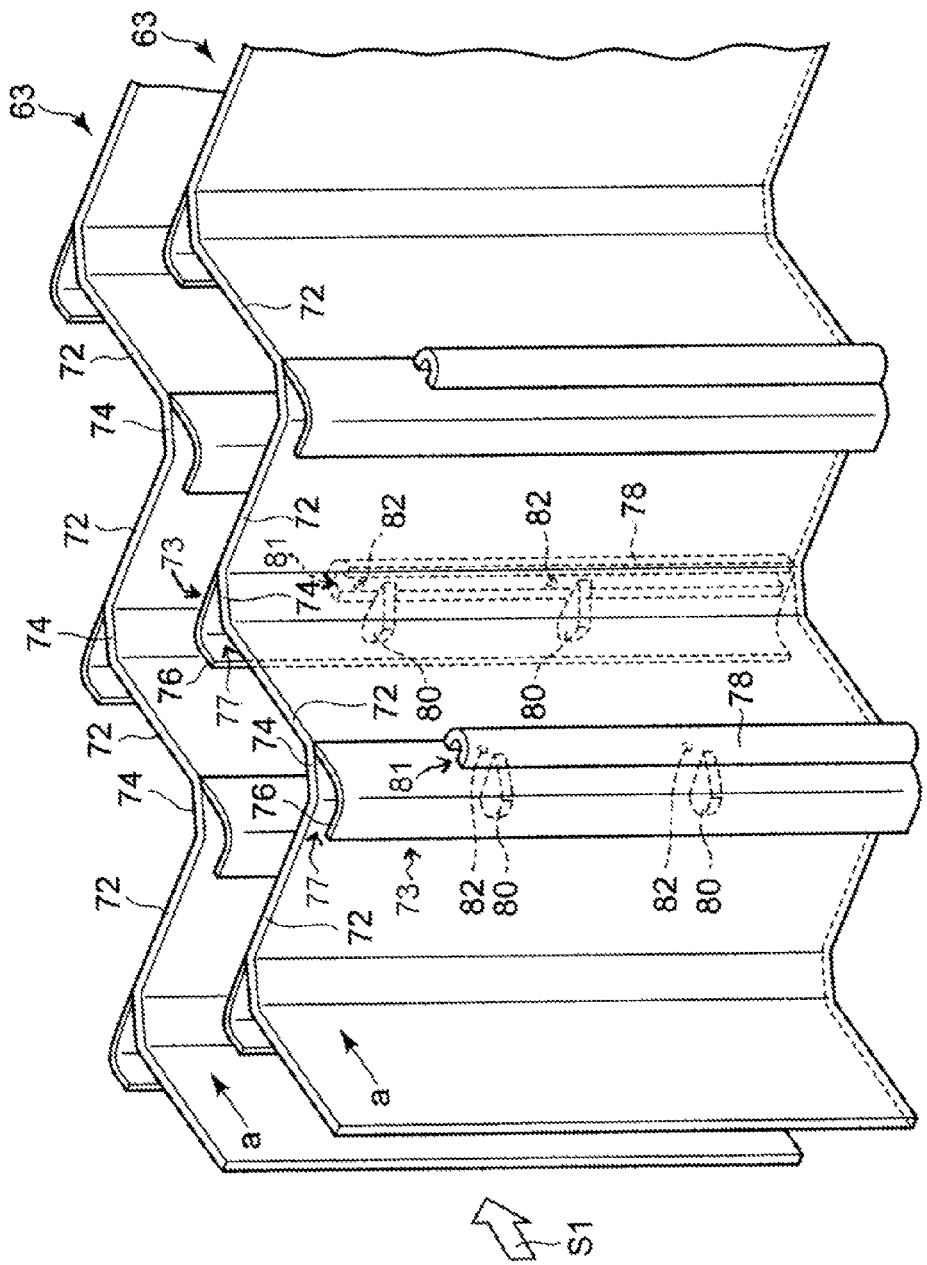
FIG. 6 is a perspective view of a corrugated plate in relation to another preferred embodiment.

In the preferred embodiment, one set of the drain plate 80 and the drain through-hole 82 is provided in the pocket section 77. However, this is not limitative and a plurality of the drain plates 80 may be provided in the height direction depending on the height of the duct plate 78 as shown in FIG. 6. By this, even with an increased height of the corrugated plate 63, it is possible to suppress increasing of the liquid film thickness in the pocket section 77. In such case, the same number of drain plates 80 and the drain through-holes are provided so that the top surface of each of the drain plates 80 is in communication with the drain duct section 81.

A second preferred embodiment of the present invention is now explained. Hereinafter, the same reference numerals are given without adding explanations for those configurations that are the same as the prior embodiment and mainly differences are addressed.

Figure 7:
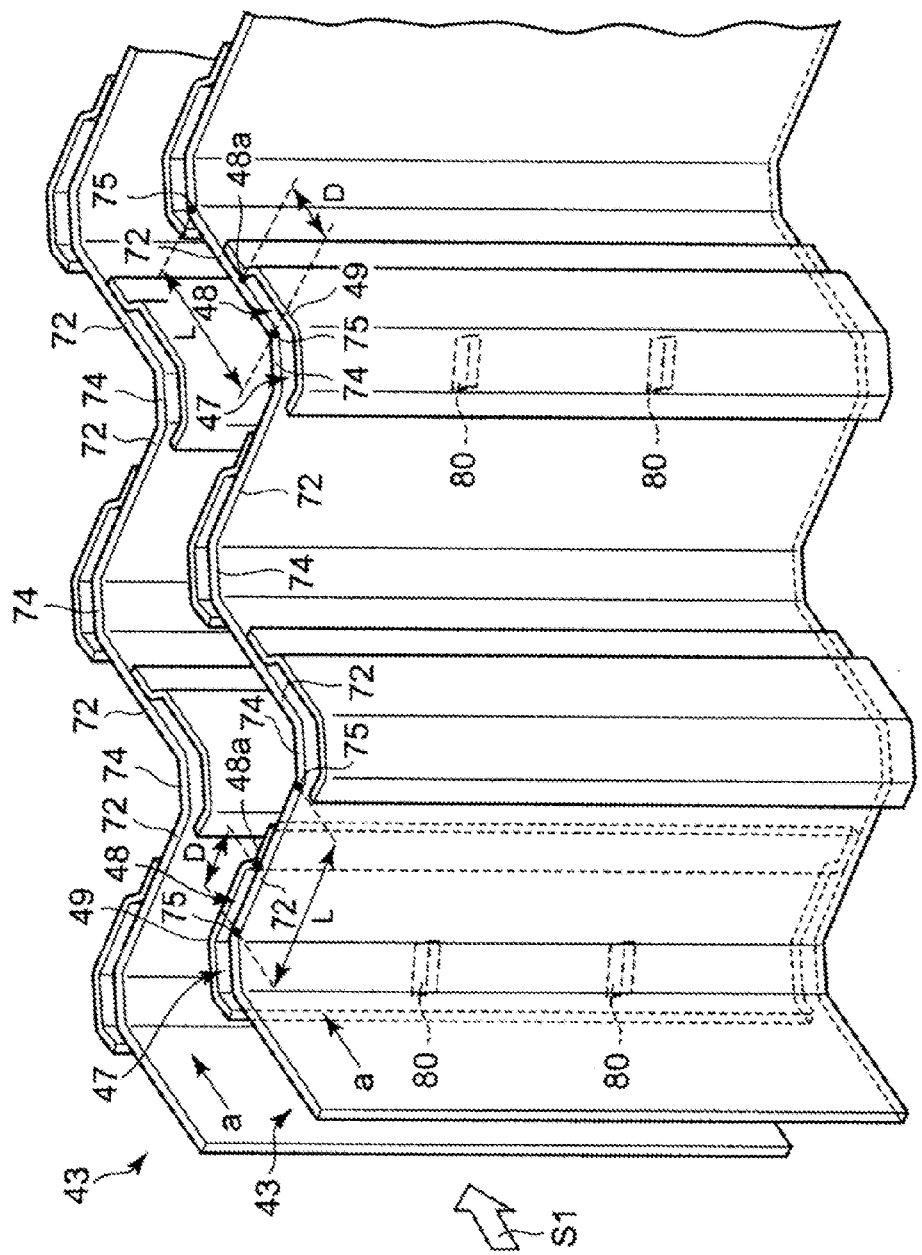
FIG. 7 is a perspective view of a corrugated plate in relation to a second preferred embodiment of the present invention.
Figure 8:
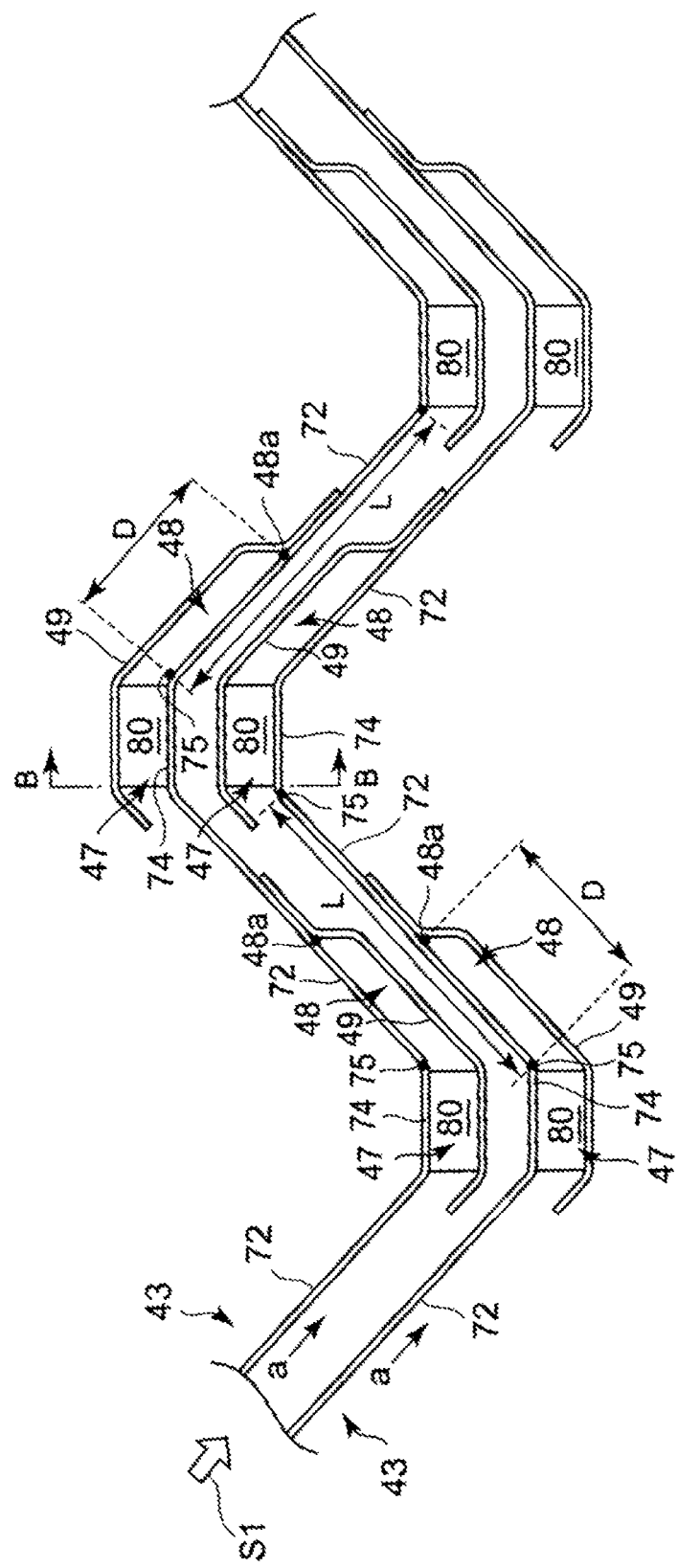
FIG. 8 is a top view of the corrugated plate in relation to the second preferred embodiment of the present invention.
Figure 9:
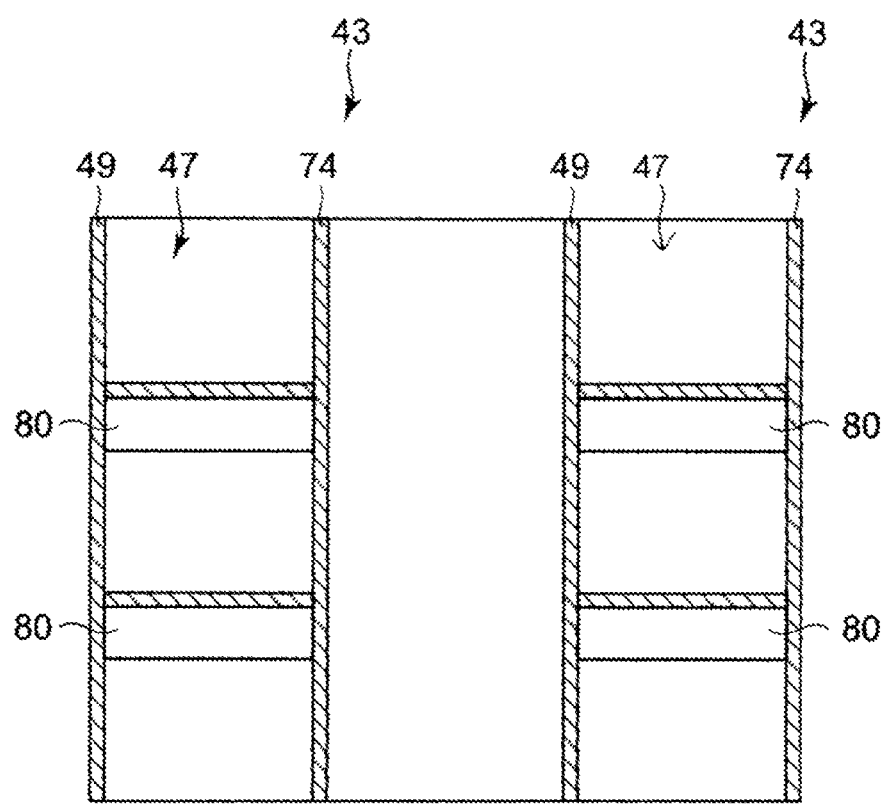
FIG. 9 is a fragmentary view taken along a line B-B of FIG. 8.

FIG. 7 and FIG. 8 respectively show a perspective view and a top view of a corrugated plate in relation to a second preferred embodiment of the present invention. FIG. 9 is a fragmentary view taken along a line B-B of FIG. 8.

As shown in FIG. 7 through FIG. 9, a corrugated plate 43 of the second preferred embodiment has the flat portion 74 (projection which projects toward the steam passage) and the slope portion 72. The corrugated plate 43 is also provided with a collecting plate 49 which is formed to cover an upstream end of the slope portion 72 disposed on the downstream side of the flat portion 74 and also to cover the flat portion 74. The collecting plate 49 has an opening that opens to the steam flow S1. The collecting plate 49 is fixed to the slope portion 72 at the base end thereof. The collecting plate 49 includes a plurality of bends between the base end and a tip end such that a overall shape of the collecting plate 49 is formed along the shape of the body portion of the corrugated plate 43 (the flat portion 74 and the slope portion 72). Specifically, at a first bend, the collecting plate 49 bends outward from the base end toward the tip end in a direction away from the body portion of the corrugated plate 43. At a second bend, with a certain distance away from the body portion of the corrugated plate 43, the collecting plate 49 bends to be shaped along the slope portion 72. At a third bend on a downstream side of the second bend, the collecting plate 49 bends to be shaped along the flat portion 74. At a fourth bend on an upstream side of the third bend, the collecting plate bends to be shaped along the slope portion 72.

A drain duct section 48 is formed by the collecting plate 49. The drain duct section 48 is formed in communication with the pocket section 47 on a downstream side of the pocket section 47 in the direction of the wet steam flow S1 which streams along the surface of the corrugated plate 43 and enters the pocket section 47. The drain duct portion 48 extends approximately to a middle of the slope portion 72. Herein, the corrugated plate 43 satisfies a relationship below.

$$D = L/2 \qquad (1)$$

In the above formula (1), D is a distance between a boundary position 75 between the flat portion 74 (the projection) and the slope portion 72 on the downstream side of the flat portion 74, and a downstream end 48a of the drain duct section 48 in the direction of the wet steam flow (a position to which the collecting plate 49 is fixed), and L is a length of the slope portion 72 (a portion between the projection projecting toward the steam passage and the depression depressed from the steam passage).

In the preferred embodiment, the distance D between the boundary position 75 and the downstream end 48a of the drain duct section 48 is set half of the length L of the slope portion 72. However, this is not limitative and the drain duct section 48 is formed such that the corrugated plate 43 satisfies a relationship of $0 \leq D/L \leq 0.5$ wherein D is a distance between the boundary position 75 and the downstream end 48a of the drain duct section 48 and L is a length of the slope portion 72.

In the pocket section 47 of the collecting plate 49, a plurality of drain plates 80 are provided at equal intervals in the height direction such as to partition the pocket section 47 in the height direction. Each of the drain plates 80 is downwardly-inclined toward the downstream side in the direction of the wet steam flow S1. In the preferred embodiment, the drain plates 80 are provided such as to partition the pocket section 47 at equal intervals in the height direction. However, this is not limitative.

In the corrugated plate 43 with the above structure, in the case where the wet steam S1 streams through the steam passage between the corrugated plates 43 in the direction of the arrow A as shown in FIG. 7 and FIG. 8, in a manner similar to the first preferred embodiment, the moisture contained in the wet steam S1 turns into droplets and enters the pocket section from the opening of the collecting plate 49, forming a liquid film therein.

A part of the moisture in the pocket section 47 is pushed by the wet steam S1 streaming into the pocket section 47 to enter the drain duct section 48 and forms a liquid film therein. Meanwhile, a large part of the wet steam S1 passing through the flow passage flows outside the collecting plate 49 toward the downstream side.

The moisture collected in the drain duct section 48 and the pocket section 47 as the liquid film, falls down the drain duct section 48 and the pocket section 47 respectively by gravity. The moisture collected in the drain duct section 48 is pushed by the wet steam flow S1 deeper into the downstream side. As progressing downstream in the drain duct section 48, the moisture falls down and flows down to the drain 65 arranged below.

The moisture collected in the pocket section 47 falls down the pocket section 47 and reaches the top surface of each of the drain plates 80. Then, the moisture flows downward over the drain plate 80 in the direction of the tilt. Once the moisture enters the drain duct section 48, the moisture enters the drain duct section 48 and falls down the drain duct section 48 to the bottom and then flows down to the drain 65 to be collected.

As described above, according to the second preferred embodiment, the moisture collected in the pocket section 47 above each of the drain plates 80, moves over each drain plate 80 into the drain duct section 48 and falls down the drain duct section 48. This suppresses an amount of the moisture falling down the pocket section 47, thereby reducing thickness of the liquid film. As a result, it is possible to prevent re-entrainment of the moisture collected by the corrugated plate 43. Further, the moisture is pushed deeper into the drain duct section 48 by the wet steam S1 and falls down in the back of the drain duct section 48, thereby preventing re-entrainment of the moisture. Therefore, even with an increased height of the corrugated plate 43, it is possible to suppress a decrease in performance of moisture separation caused by the re-entrainment of the moisture.

Further, the collective plate 49 is a single piece and thus, is inexpensive to make and easy to mount to the body portion of the corrugated plate 43.

In the second preferred embodiment, a plurality of the drain plates 80 are provided in each pocket section 47. However, this is not limitative and only one drain plate 80 may be provided in each pocket section 47. In such case, the drain plate 80 is preferably provided at a height that is approximately half of the height of the corrugated plate 43.

A third preferred embodiment of the present invention is explained now.

Figure 10:
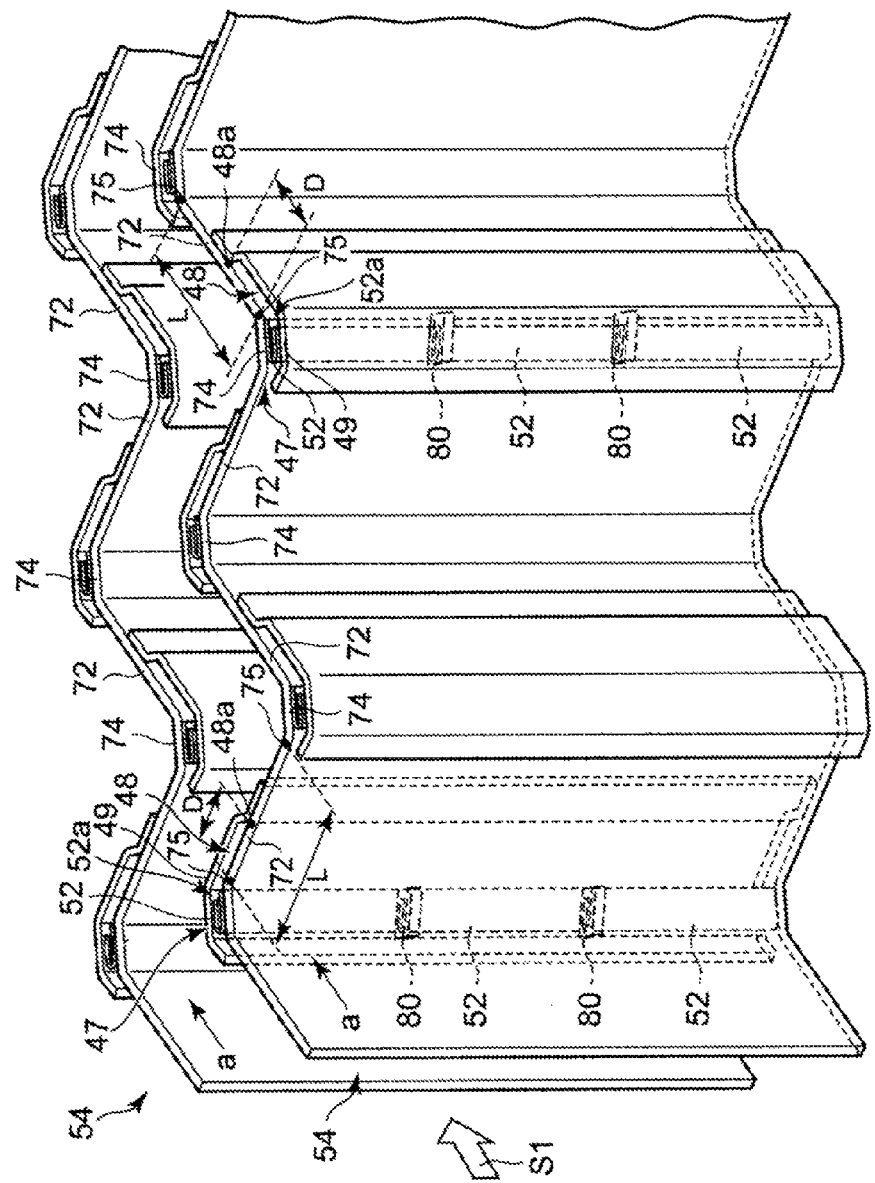
FIG. 10 is a perspective view of a corrugated plate in relation to a third preferred embodiment of the present invention.
Figure 11:
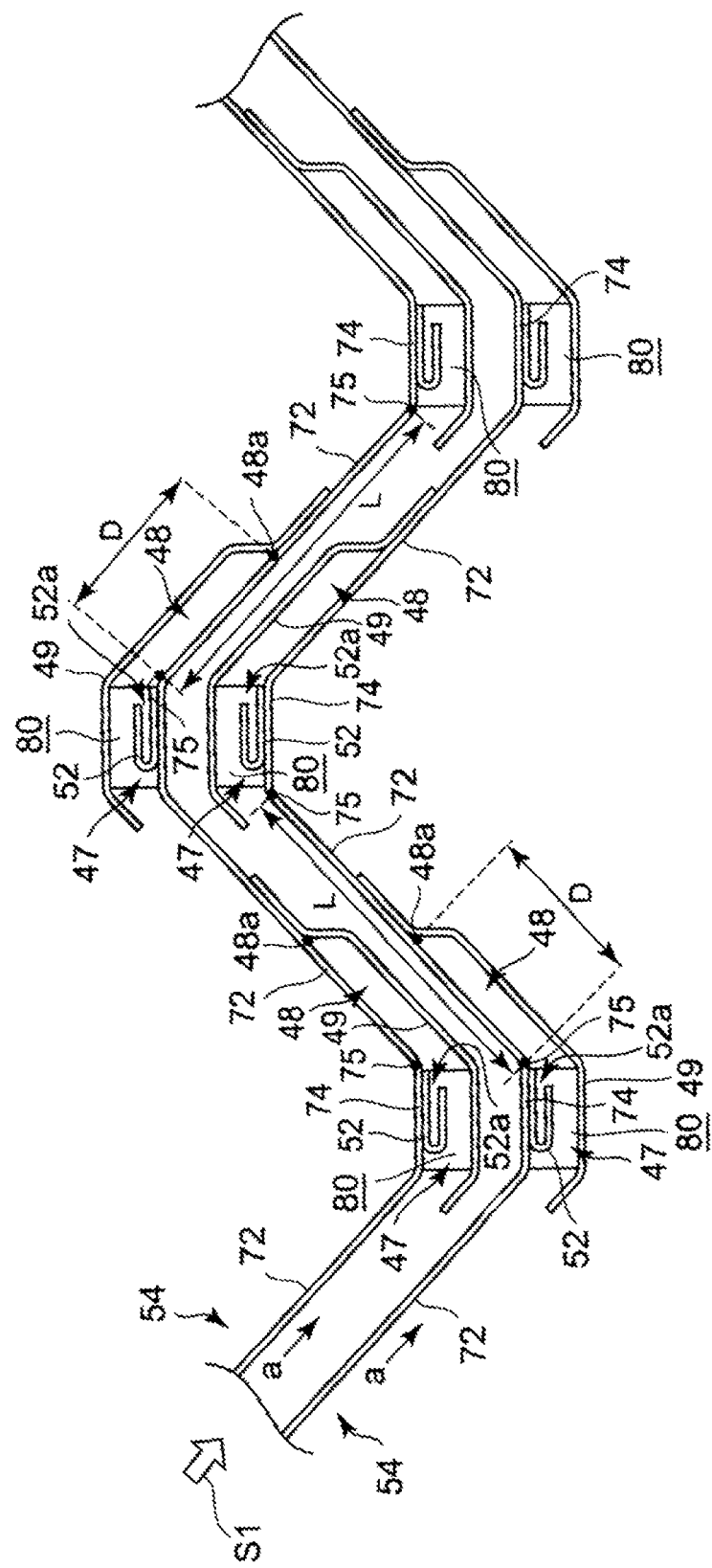
FIG. 11 is a top view of the corrugated plate in relation to the third preferred embodiment of the present invention.

FIG. 10 and FIG. 11 respectively show a perspective view and a top view of a corrugated plate in relation to the third preferred embodiment of the present invention.

As shown in FIG. 10 and FIG. 11, the corrugated plate 54 of the third preferred embodiment is provided with the collecting plate 49 in a manner similar to the second preferred embodiment. Between the collecting plate 49 and the body portion of the corrugated plate 54, the pocket section 47 and the drain duct section 48 are formed. Further, a plurality of the drain plates 80 are provided in the pocket section 47.

On the flat portion 74 facing the pocket section 47 of the third preferred embodiment, a backflow preventing member is provided in the pocket section 47. The backflow preventing member 52 has a cross section that is substantially C-shape. The backflow preventing member 52 is fixed to the flat portion 74 such that an opening of the C-shaped cross section faces toward the drain duct section 48. The backflow preventing member 52 is provided over a highest one of the drain plates 80, between each pair of adjacent drain plates 80 and under a lowest one of the drain plates 80.

In the corrugated plate 54 having the above structure, while falling down the drain duct section 48 by gravity, a part of the moisture collected in the pocket section 47 and the drain duct section 48 falls down the drain duct flows back toward the pocket section 47 by the wet steam S1 streaming between the collecting plate 49 and the body portion of the corrugated plate 54. However, such backflow is prevented by the backflow preventing member 52 provided in the pocket section 47 to capture the refluent moisture (the part of the moisture flowing back toward the pocket section) by a concave portion 52a of the backflow preventing member 52. The refluent moisture captured in the concave portion 52a falls down the concave portion 52a by gravity and reaches the top surface of each of the drain plates 80. Then, the refluent moisture flows downward over the drain plate 80 in the direction of the tilt. Once the moisture enters the drain duct section 48, the moisture enters the drain duct section 48 and falls down the drain duct section 48 to the bottom and then flows down to the drain 65 to be collected.

According to the third preferred embodiment as described above, in addition to the effects of the second preferred embodiment, it is now possible to prevent the moisture falling down the drain duct 48 from flowing back into the steam passage, thereby suppressing the re-entrainment of the moisture having been collected by the corrugated plate 54.

Figure 12:
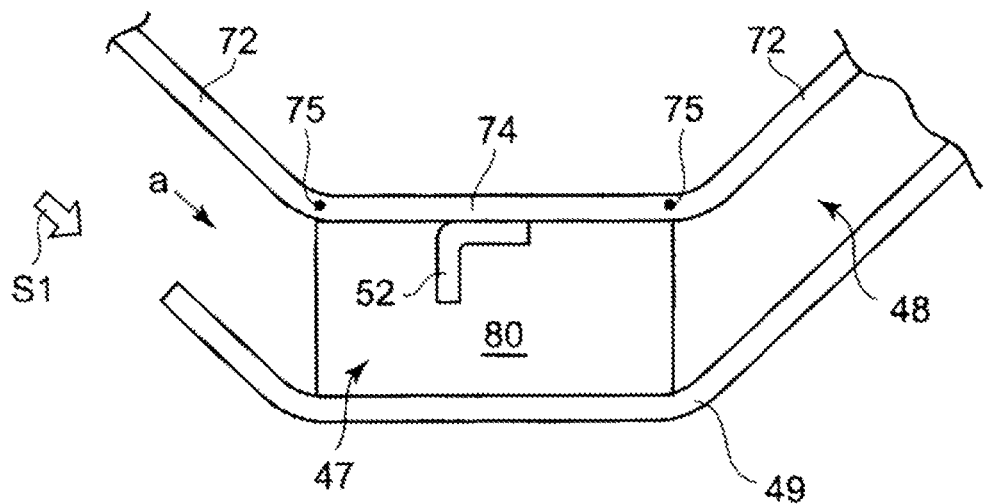
FIG. 12 shows an exemplary case of a backflow preventing member in relation to the preferred embodiments.
Figure 13:
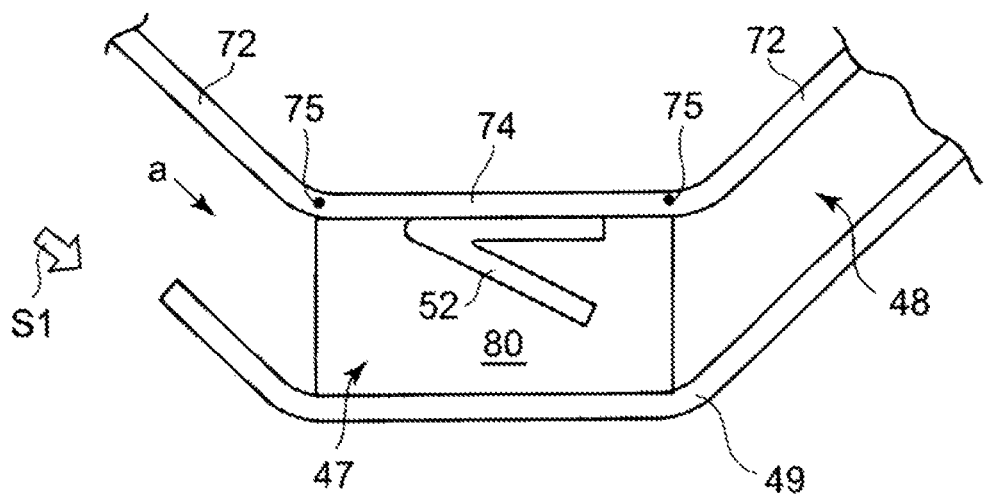
FIG. 13 shows another exemplary case of the backflow preventing member in relation to the preferred embodiments.

In the third preferred embodiment, the backflow preventing member 52 has a substantially U-shaped cross section. However, this is not limitative. For instance, a backflow preventing member having a substantially L-shaped cross section or a backflow preventing member having a substantially V-shaped cross section as shown in FIGS. 12 and 13 may be used. The backflow preventing member 52 may have any shape as long as it is capable of preventing the moisture falling down the drain duct 48 from flowing back out of the collecting plate 49.

A fourth preferred embodiment of the present invention is explained now.

Figure 14:
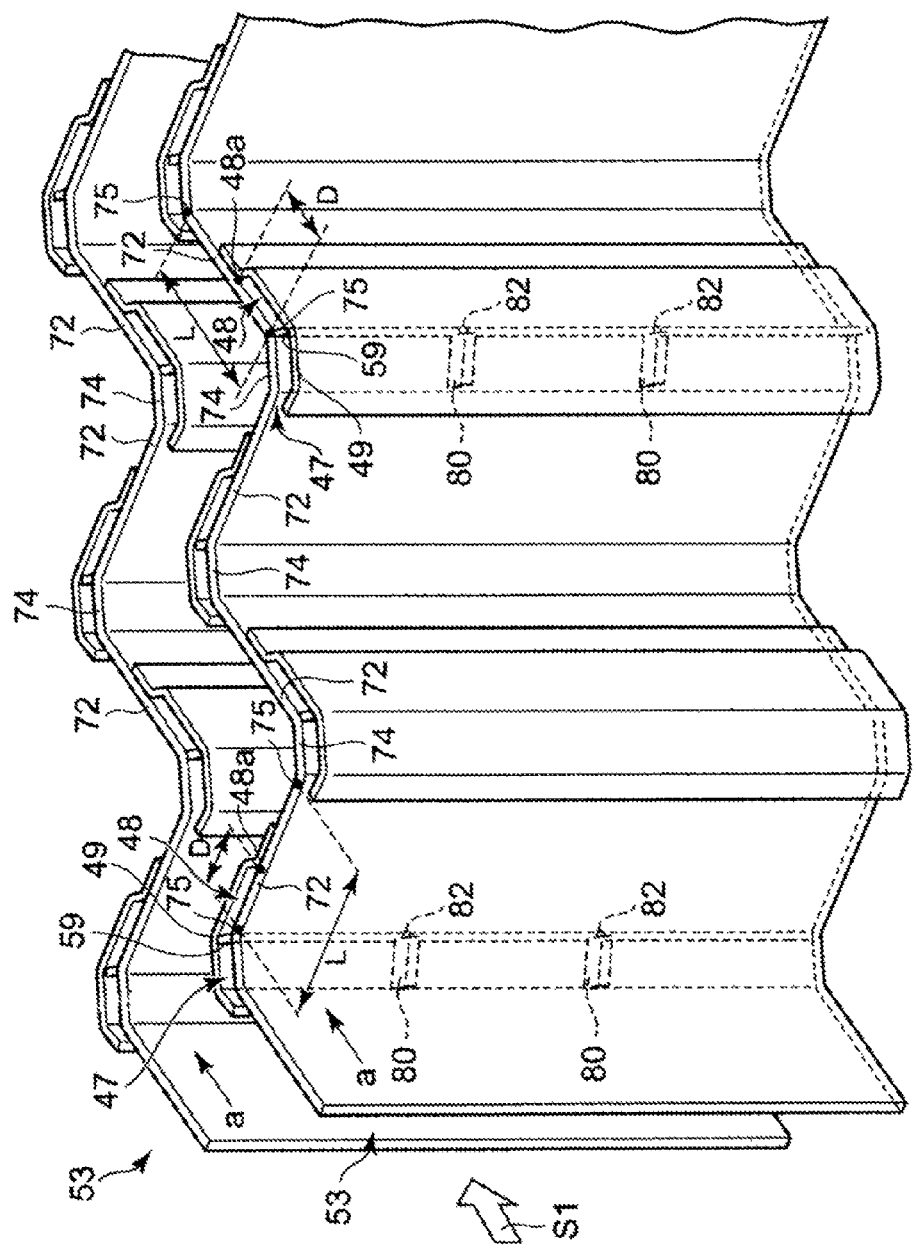
FIG. 14 is a perspective view of a corrugated plate in relation to a fourth preferred embodiment of the present invention.
Figure 15:
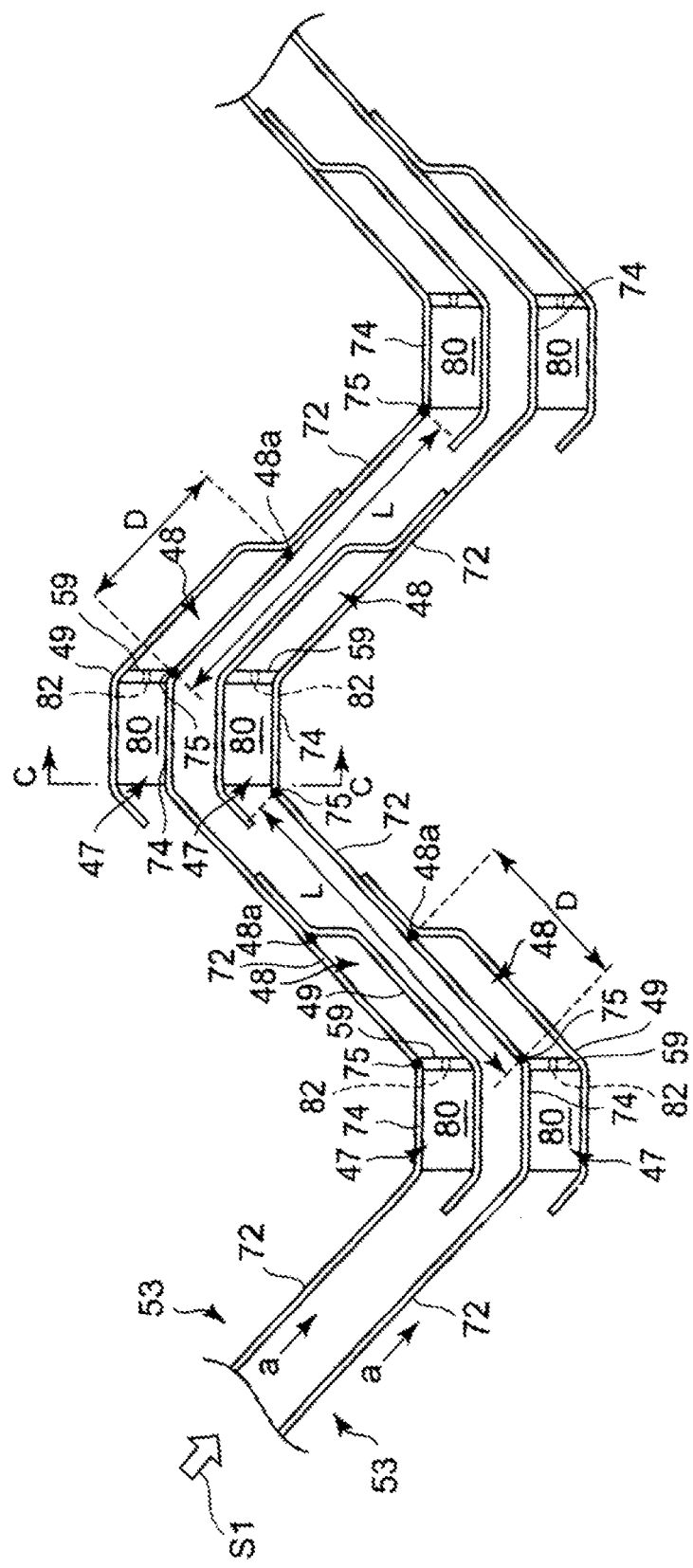
FIG. 15 is a top view of the corrugated plate in relation to the fourth preferred embodiment of the present invention.
Figure 16:
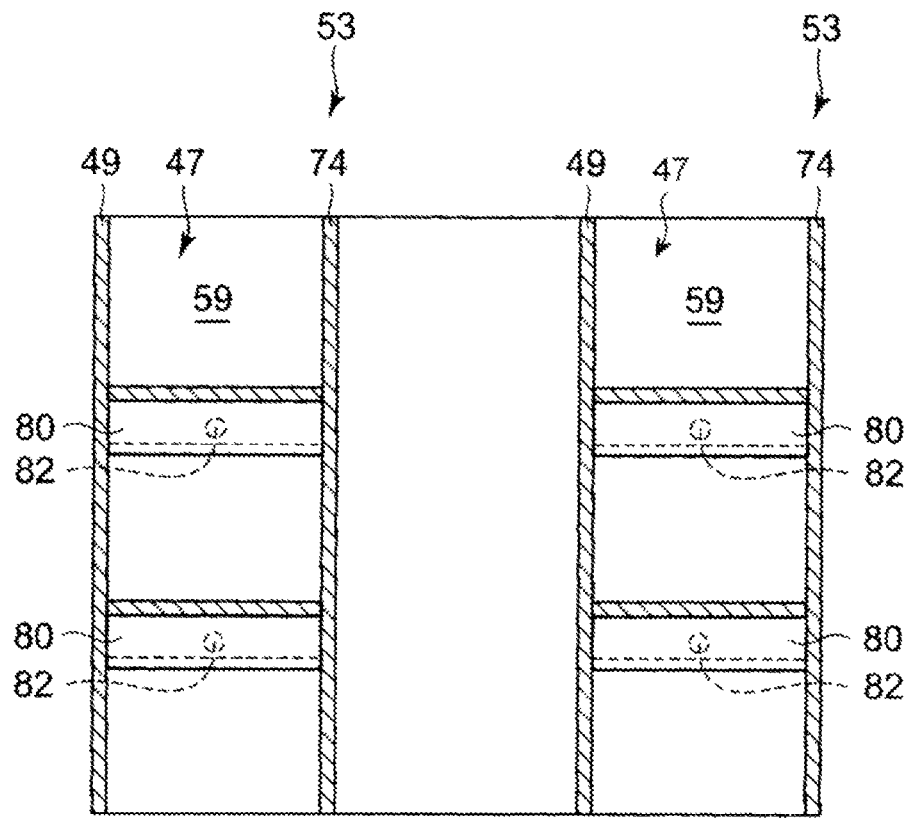
FIG. 16 is a fragmentary view taken along a line C-C of FIG. 15.

FIG. 14 and FIG. 15 respectively show a perspective view and a top view of a corrugated plate in relation to the fourth preferred embodiment of the present invention. FIG. 16 is a fragmentary view taken along a line C-C of FIG. 15.

As shown in FIG. 14 through FIG. 16, a corrugated plate 53 of the fourth preferred embodiment is provided with a collecting plate 49 in the same manner as the second and third preferred embodiments, and the pocket section 47 and the drain duct section 48 are formed between the collecting plate 49 and the body portion of the corrugated plate 53. In the pocket section 47, a plurality of the drain plates 80 are provided.

Between the collecting plate 49 and the corrugated plate 53, a divider wall 59 is provided to divide a space formed between the collecting plate 49 and the corrugated plate 53 into the pocket section 47 and the drain duct section 48. The divider wall 59 has the same height as the corrugated plate 53 and is arranged along the height direction of the corrugated plate 53.

To a side surface of the divider wall 59, an end of the drain plate 80 is connected. The divider wall 59 has drain throughholes 82 formed above the drain plates 80 so that the top surfaces of the drain plates are in communication with the drain duct section 48.

In the corrugated plate 53 having the above structure, the moisture collected in the pocket section 47 falls down the pocket section 47 by gravity. The moisture collected in the pocket section 47 below the lowest one of the drain plates 80, and falls down the pocket section 47 to the bottom and then flows down to the drain 65 to be collected.

In contrast, the moisture collected in the pocket section 47 above each of the drain plates 80, falls down the pocket section 47 and once reaching each of the drain plates 80, the moisture flows downward over each of the drain plates 80 in the direction of the tilt of the drain plate 80 and enters the drain duct section 48 through the drain through-hole 82. Then, the moisture falls down the drain duct section 48 to the bottom and then flows down to the drain 65 provided below and is collected.

According to the fourth preferred embodiment described above, the moisture collected in the pocket section 47 above each drain plate 80 moves over the drain plate 80, enters the drain duct section 48 and falls down the drain duct section 48. Thus, the moisture does not fall down the pocket section 47 past the drain plate 80. This suppresses an amount of the moisture falling down a lower part of the pocket section 47, thereby reducing a thickness of the liquid film. As a result, it is possible to prevent re-entrainment of the moisture collected by the corrugated plate 56.

The pocket section 47 and the drain duct section 48 are partitioned by the divider wall 59 so as to prevent the moisture having entered the drain duct section 48 from flowing back into the steam passage via the pocket section 47, thereby suppressing the re-entrainment of the moisture. Therefore, even with an increased height of the corrugated plate 53, it is possible to suppress a decrease in performance of moisture separation caused by the re-entrainment of the moisture.

Figure 17:
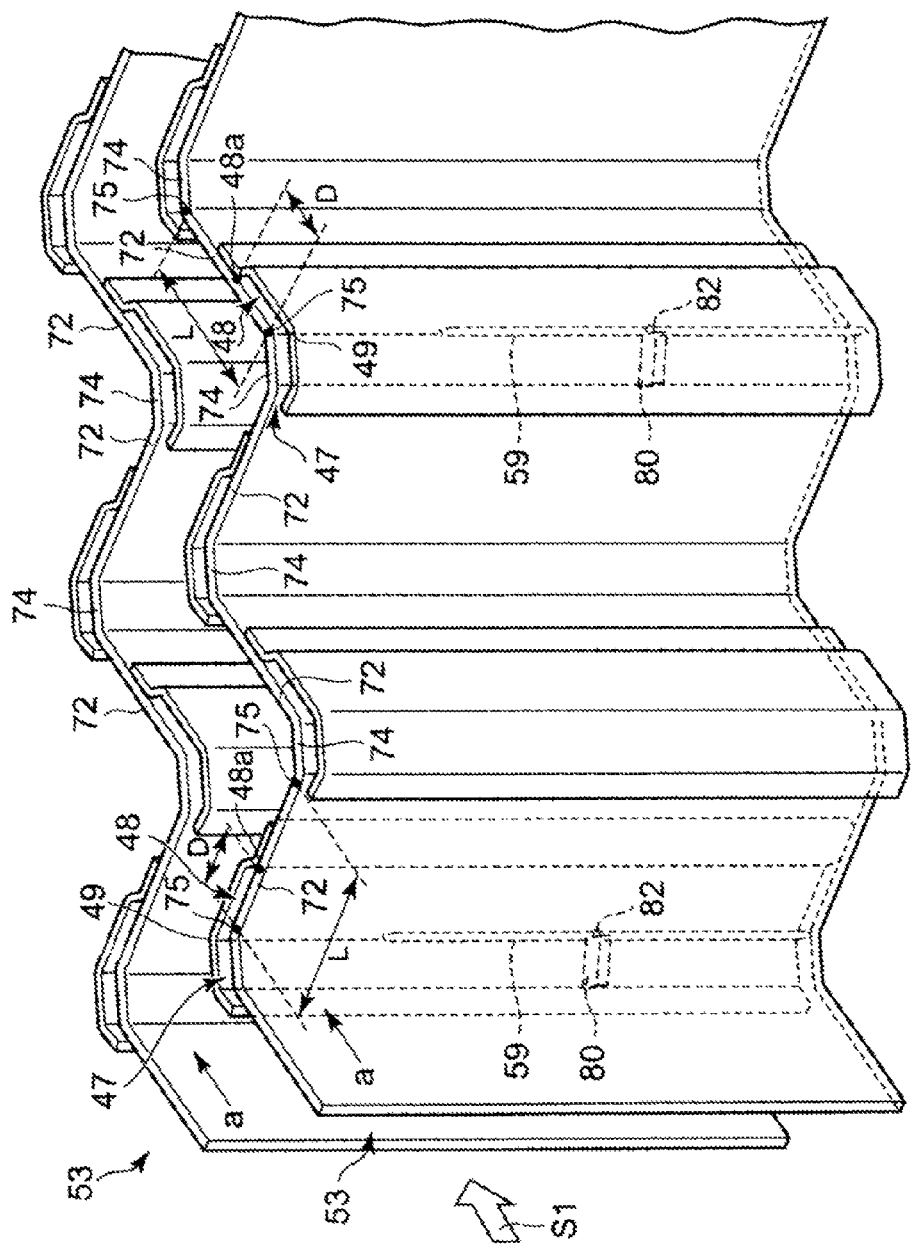
FIG. 17 shows an exemplary case of a divider wall in relation to the preferred embodiments.

In the fourth preferred embodiment, the divider wall has the same height as the corrugated plate 53. However, this is not limitative, the divider wall 59 may be shorter than the corrugated plate 53 as shown in FIG. 17. In such case, the number and positions of the drain plates are adjusted depending on the height of the divider wall 59.

A fifth preferred embodiment of the present invention is explained now.

Figure 18:
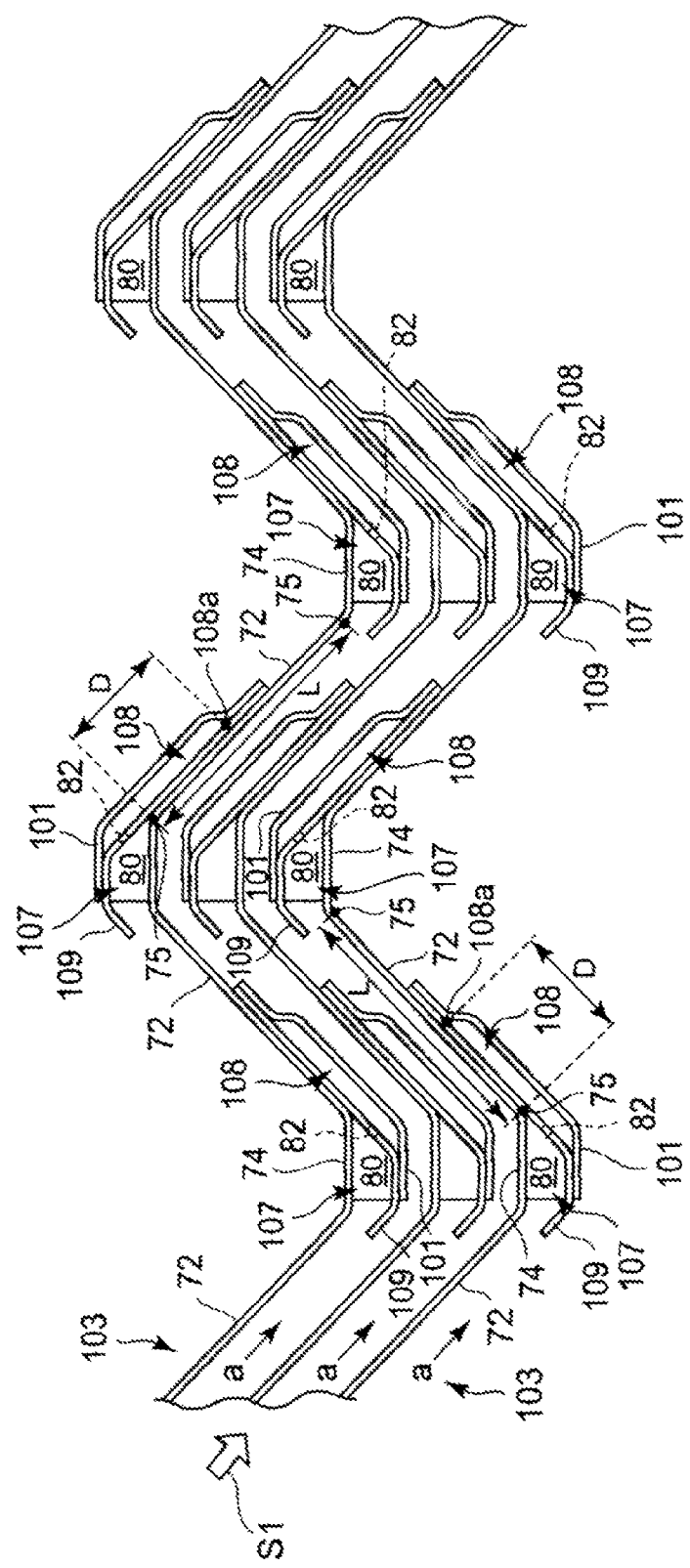
FIG. 18 is a top view of a corrugated plate in relation to a fifth preferred embodiment of the present invention.

FIG. 18 is a top view of a corrugated plate in relation to the fifth preferred embodiment of the present invention.

As shown in FIG. 18, a corrugated plate 103 of the fifth preferred embodiment is provided with a collecting plate 109, a duct plate 101 and the drain plate 80. The collecting plate 109 is formed to cover the flat portion 74 (the projection projecting toward the steam passage) and has an opening that opens to the steam flow S1. The duct plate 101 is arranged in contact with an outer surface of the collecting plate 109.

The collecting plate 109 extends upstream in the direction of the steam flow from the slope portion 72 disposed on a downstream side of the flat portion 74 such as to cover the flat portion 74. The collecting plate 109 is fixed to the slope portion 72 at a base end thereof. The collecting plate 109 bends from the base end toward a tip end thereof at a first bend to be shaped along the flat portion 74 and at a second bend, the collecting plate 109 bends to be shaped along a slope portion 72 disposed on the upstream side of the flat portion 74. Between the collecting plate 109 and the corrugated plate 103, a pocket section 107 is formed. The wet steam S1 streams along the surface of the corrugated plate 103 and enters the pocket section 107 by the collecting plate 109.

The duct plate 101 is arranged in contact with an outer surface of the collecting plate 109 at a downstream part thereof which is on a downstream side in the direction of the wet steam flow S1 and extends upstream. The duct plate 101 is fixed to the downstream part of the collecting plate 109 at a base end thereof. The duct plate 101 bends at a first bend outward away from the corrugated plate 103 at positions from the base end toward the tip end. At a second bend on an upstream side of the first bend, the duct plate 101 bends to be along the slope portion 72. At a third bend on the upstream side of the second bend, the duct plate 101 bends to be shaped along the flat portion 74. The duct plate 101 is fixed to the collecting plate 109 at a tip end thereof. The duct plate 101 is half the height of the corrugated plate 103.

By the duct plate 101, a drain duct section 108 is formed between the duct plate 101 and the collecting plate 109. In a manner similar to the second preferred embodiment, the corrugated plate 103 satisfies the relation ship defined by the formula (I) wherein D is a distance between the boundary position 75 between the flat portion 74 and the slope portion 72 and a downstream end 108a of the drain duct section 108 and L is a length of the slope portion 72.

The pocket section 107 and the drain duct section 108 are partitioned by the collecting plate 109. The collecting plate 109 has the through-hole 82 formed therein. A top surface of a lowest point of the drain plate 80 provided in the pocket section 107 is in communication with the drain duct section 108 via the drain through-hole 82.

According to the fifth preferred embodiment, in a manner similar to each of the above preferred embodiments, the moisture collected in the pocket section 107 above the drain plate 80, moves over the drain plate 80 and enters the drain duct section 108. Then, the moisture falls down the drain duct section 108 and thus, such moisture does not fall down the pocket section 107 past the drain plate 80. This suppresses an amount of the moisture falling down the pocket section 107, thereby reducing a thickness of the liquid film. As a result, it is possible to prevent re-entrainment of the moisture collected by the corrugated plate 103. The pocket section 107 and the drain duct section 108 are partitioned by the collecting plate 109 so as to prevent re-entrainment of the moisture having entered the drain duct section 108. Therefore, even with an increased height of the corrugated plate 103, it is possible to suppress a decrease in performance of moisture separation caused by the re-entrainment of the moisture.

In the fifth embodiment, an example case where the corrugated plate 103 includes the collecting plate 109 and the duct plate 101 is compared with a conventional case where a corrugated plate includes a conventional protruding member to analyze the flow rate of the wet steam S1 streaming in the steam passage according to CFD analysis (Computational Fluid Dynamics)

Figure 19:
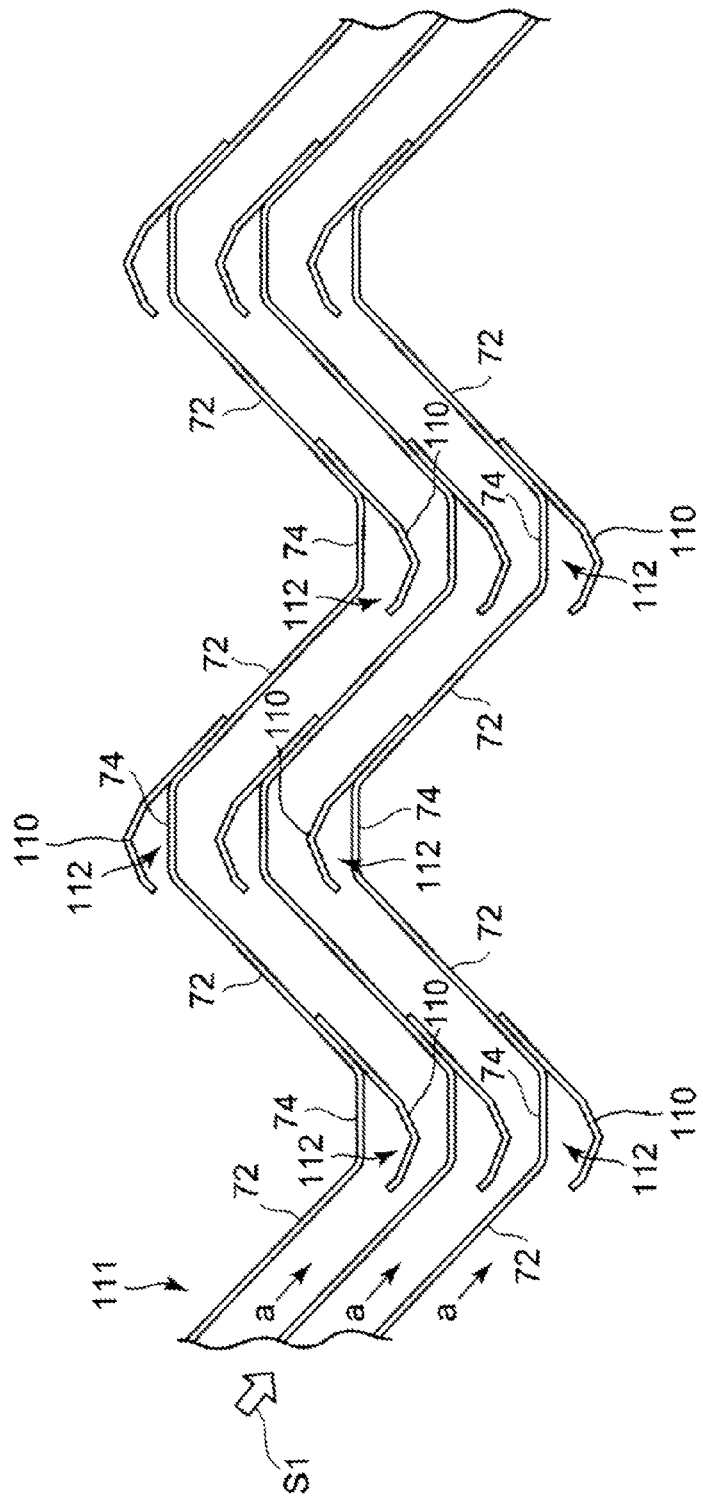
FIG. 19 is a top view of a conventional corrugated plate.

The conventional corrugated plate is explained now. FIG. 19 is a top view of the conventional corrugated plate. As shown in FIG. 19, the collecting plate 110 of the conventional corrugated plate 111 is fixed to the slope portion 72 at a base end thereof and a tip end thereof protrudes upstream in the direction of the wet steam S1. The collecting plate 110 bends such that the tip end is closer to the body portion of the corrugated plate 111. By the collecting plate 110, a pocket section 112 is formed between the collecting plate and the body portion of the corrugated plate 111.

The wet steam S1 streams along the corrugated plate 111 having the above structure. The moisture is collected in the pocket section 112 and then falls down the pocket section 112.

As described above, the CFD analysis of the flow rates of the wet steam S1 in the example case using the corrugated plate 103 and the conventional case using the corrugated plate 111 were performed.

Figure 20:
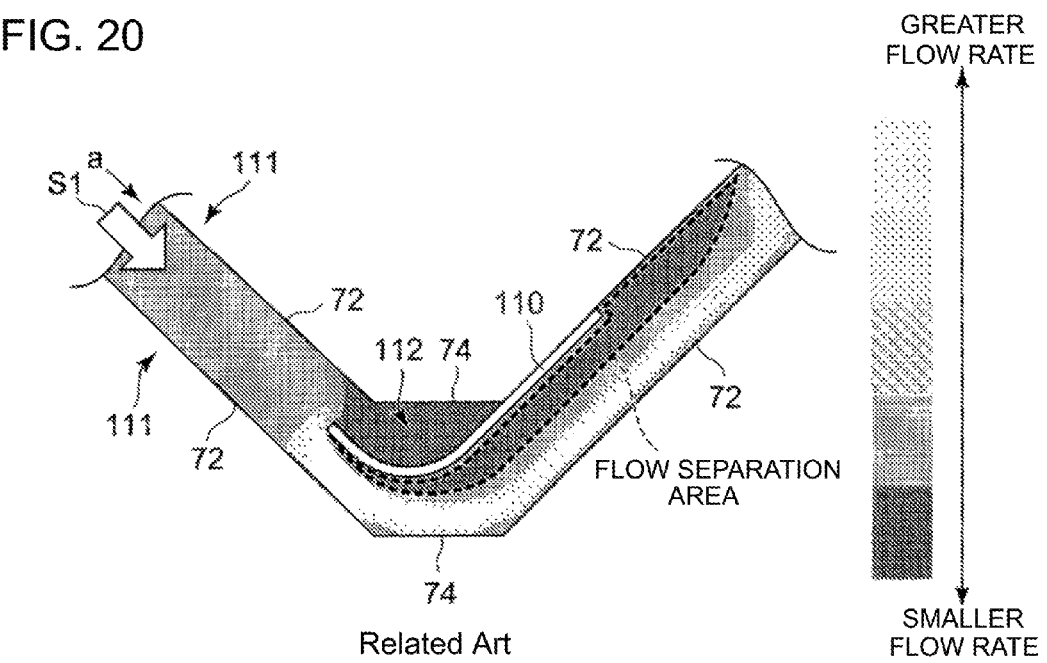
FIG. 20 is a counter map showing a flow speed distribution between the conventional corrugated plates.
Figure 21:
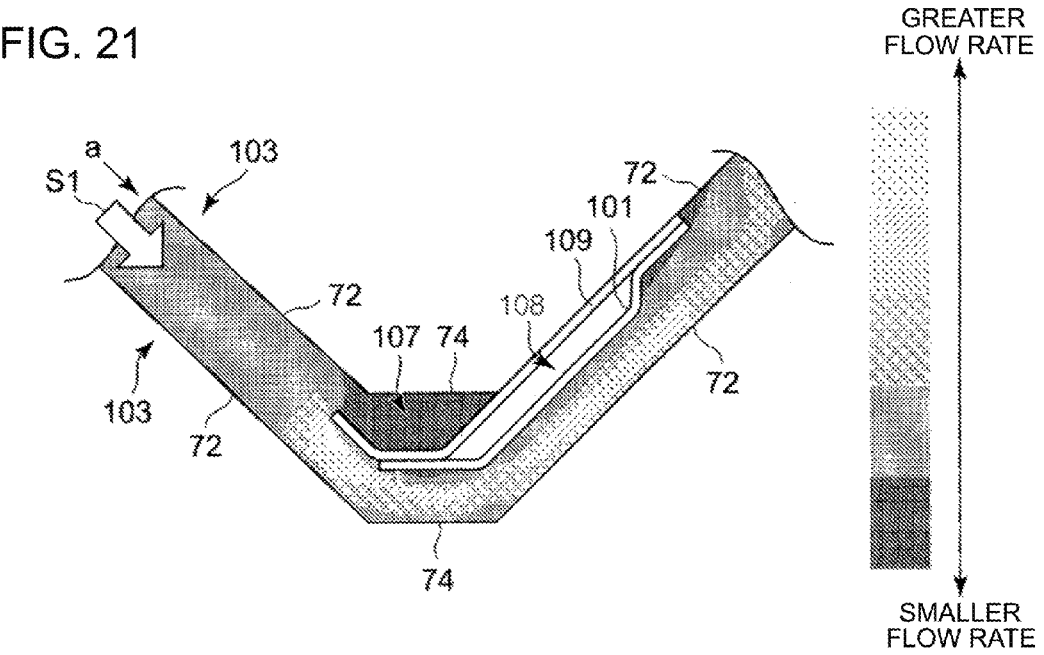
FIG. 21 is a counter map showing a flow speed distribution between the corrugated plates of the example case.

FIG. 20 and FIG. 21 are counter maps showing a flow speed distribution in an area between the corrugated plates in the conventional case and the example case.

In the conventional case shown in FIG. 20, generated in the flow passage is an area where the flow rate is small along the collecting plate 110, i.e. a flow separation area (the area surrounded by a dotted line in FIG. 20). The flow separation area extends to a downstream area which is downstream of the collecting plate 110.

In contrast, in the example case shown in FIG. 21, the wet steam S1 streams in the steam passage at approximately the same speed as the conventional case. Further, in the flow separation area, the drain duct part 108 is provided. As can be seen from the counter map of FIG. 21, there is almost no loss of the flow caused by the flow rate decline or the line by providing the drain duct section 108.

Therefore, in the first through fourth preferred embodiments, there is almost no loss in the flow by providing the drain duct section 48, 81 in a manner similar to the fifth preferred embodiment.

In each of the above preferred embodiments, the drain plate 80 is downwardly-inclined toward a downstream side in the direction of the steam flow S1. However, this is not limitative and the drain plate 80 may be arranged horizontally. In such case, the moisture having reached the drain plate 80 is pushed by the wet steam S1 and can flow toward a downstream side.

In each of the above preferred embodiments, the chevron-vane type moisture separator 16 which is applied to the moisture separator/heater is explained. However, this is not limitative and the present invention is also applicable to another chevron-vane type moisture separator.

Another example of applying the present invention is explained.

Figure 22:
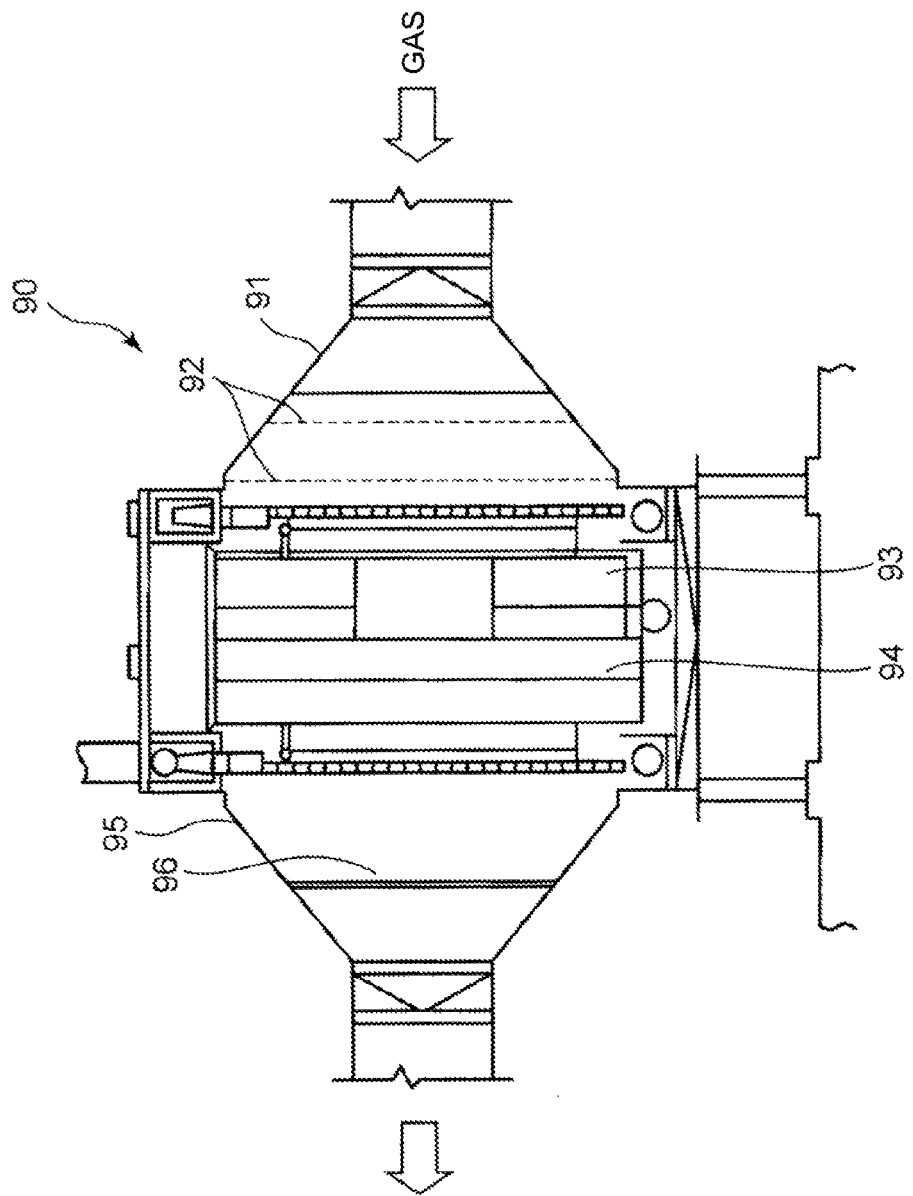
FIG. 22 shows a structure of a wet electrostatic precipitator to which the moisture separator of the present invention is applicable.

FIG. 22 shows a structure of a wet electrostatic precipitator to which the moisture separator of the present invention is applicable. This type of wet electrostatic precipitator is used, for instance, in a blast-furnace gas fired gas turbine combined-cycle system to remove dust from the moisture of fuel gas.

In a wet electrostatic precipitator 90 show in FIG. 22, fuel gas enters an inlet duct 91 in a direction of the arrow of FIG. 22 and passes through perforated lattices to a discharge electrode 93 and then a dust-removing electrode 94. In the process, the dust is removed from the fuel gas and then the fuel gas reaches an outlet duct 95.

By the moisture separator 96 of chevron type installed to the outlet duct 95, the mist is removed from the fuel gas.

A moisture separator that is similar to the moisture separator 16 explained in reference to FIG. 3 through FIG. 18 and FIG. 23 can be applied to the moisture separator 96 used in the wet electrostatic precipitator 90 described above.

INDUSTRIAL APPLICABILITY

The present invention can be used as a chevron-vane type moisture separator that is capable of suppressing increasing in thickness of the liquid film formed by the moisture collected by the collecting plate and of suppressing a decrease in performance of moisture separation caused by the re-entrainment of the moisture collected by the corrugated plate.

REFERENCE SIGNS LIST

1 Moisture separator/heater
16 Moisture separator
36 Heating chamber
43 Corrugated plate
47 Pocket section
48 Drain duct section
48a Downstream end
49 Collecting plate
52 Backflow preventing member
52a Concave portion
53 Corrugated plate
54 Corrugated plate
59 Divider wall
60 Moisture separator
61 Upper frame
62 Lower frame
63 Corrugated plate
65 Drain
72 Slope portion
73 Protruding member
74 Flat portion
75 Boundary position
76 Collecting plate
77 Pocket section
78 Duct plate
80 Drain plate
81 Drain duct section
82 Drain through-hole
90 Wet electrostatic precipitator
96 Moisture separator
101 Duct plate
103 Corrugated plate
107 Pocket section
108 Drain duct section
108a Downstream end
109 Collecting plate
110 Conventional collecting plate
111 Conventional corrugated plate
112 Conventional pocket section

The invention claimed is:

1. A moisture separator which separates moisture from moist steam, comprising:
  a plurality of corrugated plates each having a zigzag cross-sectional shape with a projection and a depression that are arranged alternately, said plurality of corrugated plates being arranged at an interval to form a steam passage for the moist steam; and
  a plurality of collecting plates which are fixed to the corrugated plates, each of said collecting plates extending upstream in a direction of a steam flow within the steam passage so as to cover the projection of each of the corrugated plates,
  wherein a pocket section with an opening which opens to an upstream side in the direction of the steam flow is formed between the collecting plates and each of the corrugated plates,
  wherein a drain duct section is provided on a downstream side of the pocket section in the direction of the steam flow and is in communication with the pocket section, said drain duct section extending vertically,
  wherein each of the corrugated plates includes a flat portion forming the projection and a slope portion disposed on a downstream side of the flat portion,
  wherein each of the collecting plates includes a first portion extending along the flat portion, a second portion disposed on a downstream side of the first portion to extend along the slope portion, and a third portion on a downstream side of the second portion whose one end is connected to the second portion and whose other end is fixed to the slope portion of each of the corrugated plates, and
  wherein the drain duct section is formed at least partially by a space, the second portion of each of the collecting plates and the slope portion on the downstream side of the flat portion.

2. The moisture separator according to claim 1,
  wherein a space having an upstream portion and a downstream portion arranged in the direction of the steam flow is formed between the collecting plates and each of the corrugated plates, the upstream portion functioning as the pocket section and downstream portion functioning as the drain duct section.

3. The moisture separator according to claim 2,
  wherein each of the corrugated plate satisfies a relationship of $0 \leq D/L \leq 0.5$ where D is a distance between the projection and a position to which each of the collecting plates is fixed and L is a distance between the projection and the depression of each of the corrugated plates.

4. The moisture separator according to claim 1, further comprising:
  a backflow preventing member which is provided in the pocket section and prevents the moisture entrained in the pocket section from flowing back to the steam passage.

5. A moisture separator which separates moisture from moist steam, comprising:
  a plurality of corrugated plates each having a zigzag cross-sectional shape with a projection and a depression that are arranged alternately, said plurality of corrugated plates being arranged at an interval to form a steam passage for the moist steam; and
  a plurality of collecting plates which are fixed to the corrugated plates, each of said collecting plates extending upstream in a direction of a steam flow within the steam passage so as to cover the projection of each of the corrugated plates, wherein a pocket section with an opening which opens to an upstream side in the direction of the steam flow is formed between the collecting plates and each of the corrugated plates, wherein a drain duct section is provided on a downstream side of the pocket section in the direction of the steam flow and is in communication with the pocket section, said drain duct section extending vertically, wherein the moisture separator further comprises a drain plate which is provided between the collecting plates and each of the corrugated plates to direct the moisture entrained in the pocket section to the drain duct section, wherein the drain plate is arranged horizontally or is downwardly-inclined toward a downstream side in the direction of the steam flow.

6. The moisture separator according to claim 5,
wherein a plurality of said drain plates are provided in a height direction of the pocket section.

7. The moisture separator according to claim 6,
wherein the drain plate is arranged so as to equally divide the pocket section in the height direction.

8. A moisture separator which separates moisture from moist steam, comprising:
   a plurality of corrugated plates each having a zigzag cross-sectional shape with a projection and a depression that are arranged alternately, said plurality of corrugated plates being arranged at an interval to form a steam passage for the moist steam; and
   a plurality of collecting plates which are fixed to the corrugated plates, each of said collecting plates extending upstream in a direction of a steam flow within the steam passage so as to cover the projection of each of the corrugated plates, wherein a pocket section with an opening which opens to an upstream side in the direction of the steam flow is formed between the collecting plates and each of the corrugated plates, wherein a drain duct section is provided on a downstream side of the pocket section in the direction of the steam flow and is in communication with the pocket section, said drain duct section extending vertically, wherein the moisture separator further comprises a duct plate which is provided on an outer surface of the collecting plates and extends vertically to a height which is less than a height of each of the collecting plates, said duct plate having an arc-shaped cross-section which each end fixed downstream of a tip end of each of the collecting plates where the tip end marks a beginning of the opening of the pocket section, wherein the pocket section is formed between the collecting plates and each of the corrugated plates and the drain duct section is formed between the duct plate and each of the collecting plates, and wherein the drain duct section is in communication with the pocket section through a drain through-hole which is formed in each of the collecting plates.

9. The moisture separator according to claim 8, further comprising:
   a drain plate which is provided between the collecting plates and each of the corrugated plates to direct the moisture entrained in the pocket section to the drain duct section via the drain through-hole,
   wherein the drain plate is arranged horizontally or is downwardly-inclined toward a downstream side in the direction of the steam flow.

10. The moisture separator according to claim 9,
wherein a plurality of said drain plates are provided in a height direction of the pocket section, and
wherein a plurality of the drain through-holes are respectively provided for drain plates so that a top surface of each of the drain plates is in communication with the drain duct section.

11. The moisture separator according to claim 10, wherein the drain plate is arranged so as to equally divide the pocket section in the height direction.

* * * * *